(12) United States Patent
Misawa

(10) Patent No.: US 9,864,481 B2
(45) Date of Patent: Jan. 9, 2018

(54) ELECTRONIC APPARATUS, IMAGE OUTPUT METHOD, AND PROGRAM THEREFOR

(75) Inventor: Tomonori Misawa, Tokyo (JP)

(73) Assignee: SONY CORPORATION, Tokyo (JP)

(*) Notice: Subject to any disclaimer, the term of this patent is extended or adjusted under 35 U.S.C. 154(b) by 789 days.

(21) Appl. No.: 13/069,501

(22) Filed: Mar. 23, 2011

(65) Prior Publication Data

US 2011/0246942 A1    Oct. 6, 2011

(30) Foreign Application Priority Data

Mar. 30, 2010 (JP) ................. P2010-079167

(51) Int. Cl.
G06F 3/048 (2013.01)
G06F 3/0482 (2013.01)
G06F 3/0481 (2013.01)
G06F 3/0485 (2013.01)
G06F 17/30 (2006.01)

(52) U.S. Cl.
CPC .......... G06F 3/0482 (2013.01); G06F 3/0485 (2013.01); G06F 3/04815 (2013.01); G06F 17/30274 (2013.01)

(58) Field of Classification Search
CPC .................. G06F 3/04815; G06F 17/30274
USPC .......................................................... 715/830
See application file for complete search history.

(56) References Cited

U.S. PATENT DOCUMENTS

| | | | |
|---|---|---|---|
| 2002/0075324 A1* | 6/2002 | Combs et al. ............. | 345/848 |
| 2005/0200611 A1* | 9/2005 | Goto et al. ............... | 345/173 |
| 2006/0071942 A1* | 4/2006 | Ubillos ............... | G06F 3/0483 345/619 |
| 2006/0165380 A1* | 7/2006 | Tanaka et al. ................. | 386/95 |
| 2007/0030283 A1* | 2/2007 | Shiraishi et al. ............. | 345/581 |
| 2007/0110338 A1* | 5/2007 | Snavely ............ | G06F 17/30274 382/305 |
| 2007/0211151 A1* | 9/2007 | Baiping ............ | G06F 17/30244 348/231.2 |
| 2008/0126979 A1* | 5/2008 | Abe et al. ..................... | 715/781 |
| 2009/0150772 A1* | 6/2009 | Noda .................... | G06F 3/0481 715/277 |
| 2009/0164439 A1* | 6/2009 | Nevins ............. | G06F 17/30551 |
| 2010/0053355 A1* | 3/2010 | Iwase et al. ............... | 348/222.1 |

(Continued)

FOREIGN PATENT DOCUMENTS

JP    2009-037082    2/2009

*Primary Examiner* — Weilun Lo
*Assistant Examiner* — Patrick Ramsey
(74) *Attorney, Agent, or Firm* — Chip Law Group

(57) ABSTRACT

Provided is an electronic apparatus including: a storage to classify images into each of groups, and to store the classified images; an output unit to output, as a representative image of the group, a thumbnail image of each of the images, which are extracted one by one for each of the groups from the images classified into the groups; an operation detecting unit to detect a predetermined operation by the user with respect to the output representative image; and a controller to control, when the predetermined operation is detected, the output unit to output the thumbnail images of the images classified into the group in which the representative image is extracted, together with the output representative image, the thumbnail images being arranged in a predetermined direction, and to scroll the thumbnail images in the predetermined direction.

8 Claims, 19 Drawing Sheets

(56) References Cited

U.S. PATENT DOCUMENTS

| | | | |
|---|---|---|---|
| 2010/0185984 A1* | 7/2010 | Wright | G06T 11/206 715/833 |
| 2010/0250617 A1* | 9/2010 | Aihara | G06F 17/3028 707/802 |
| 2011/0066627 A1* | 3/2011 | Seung | G06F 17/30265 707/758 |
| 2011/0080351 A1* | 4/2011 | Wikkerink et al. | 345/173 |
| 2011/0109634 A1* | 5/2011 | Cundill et al. | 345/473 |
| 2013/0039546 A1* | 2/2013 | Bae | G06F 17/30241 382/113 |

* cited by examiner

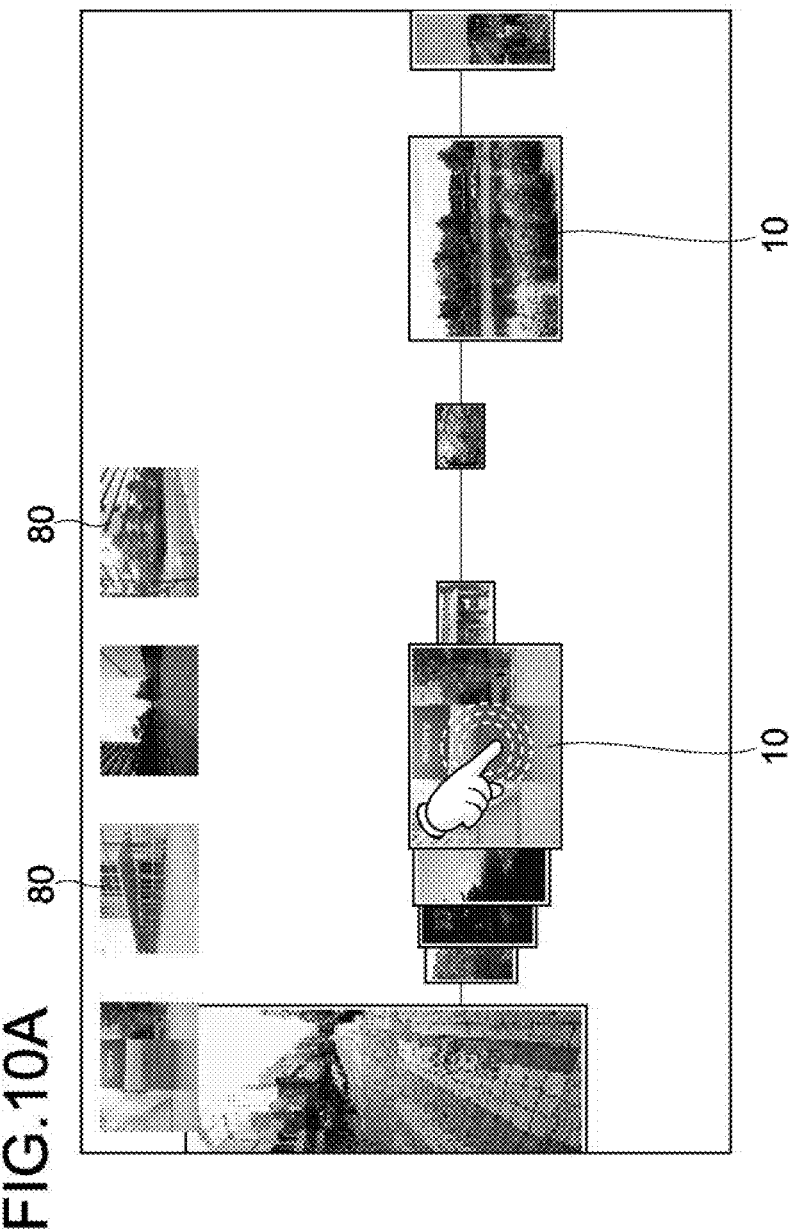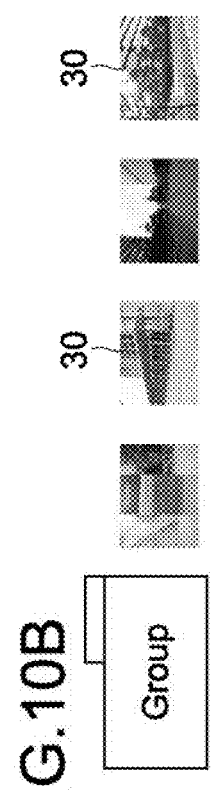

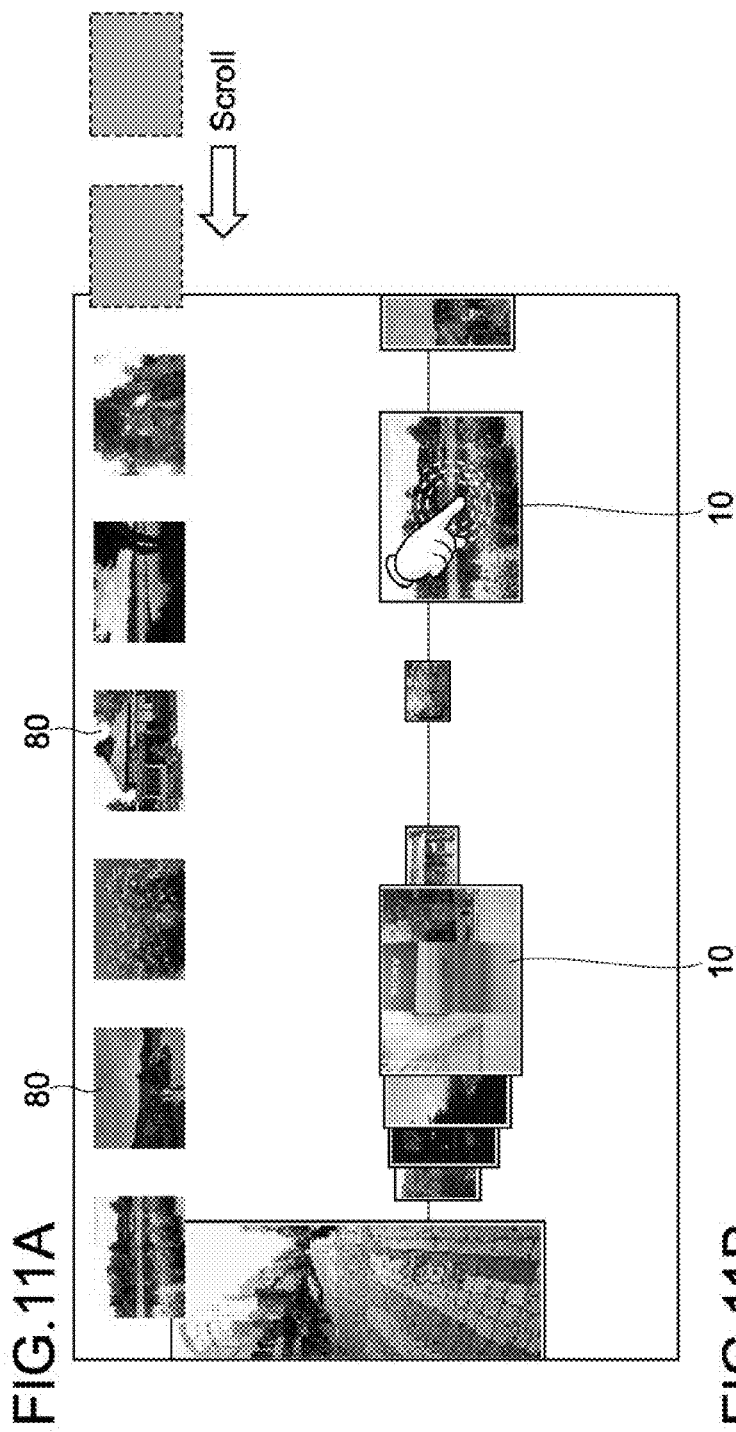
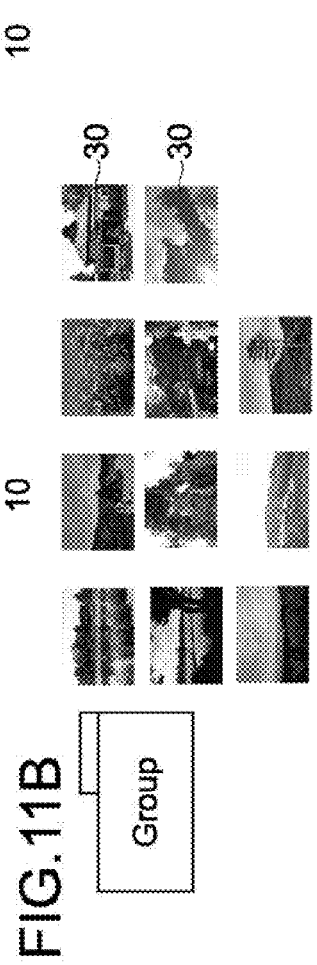
FIG.11A
FIG.11B

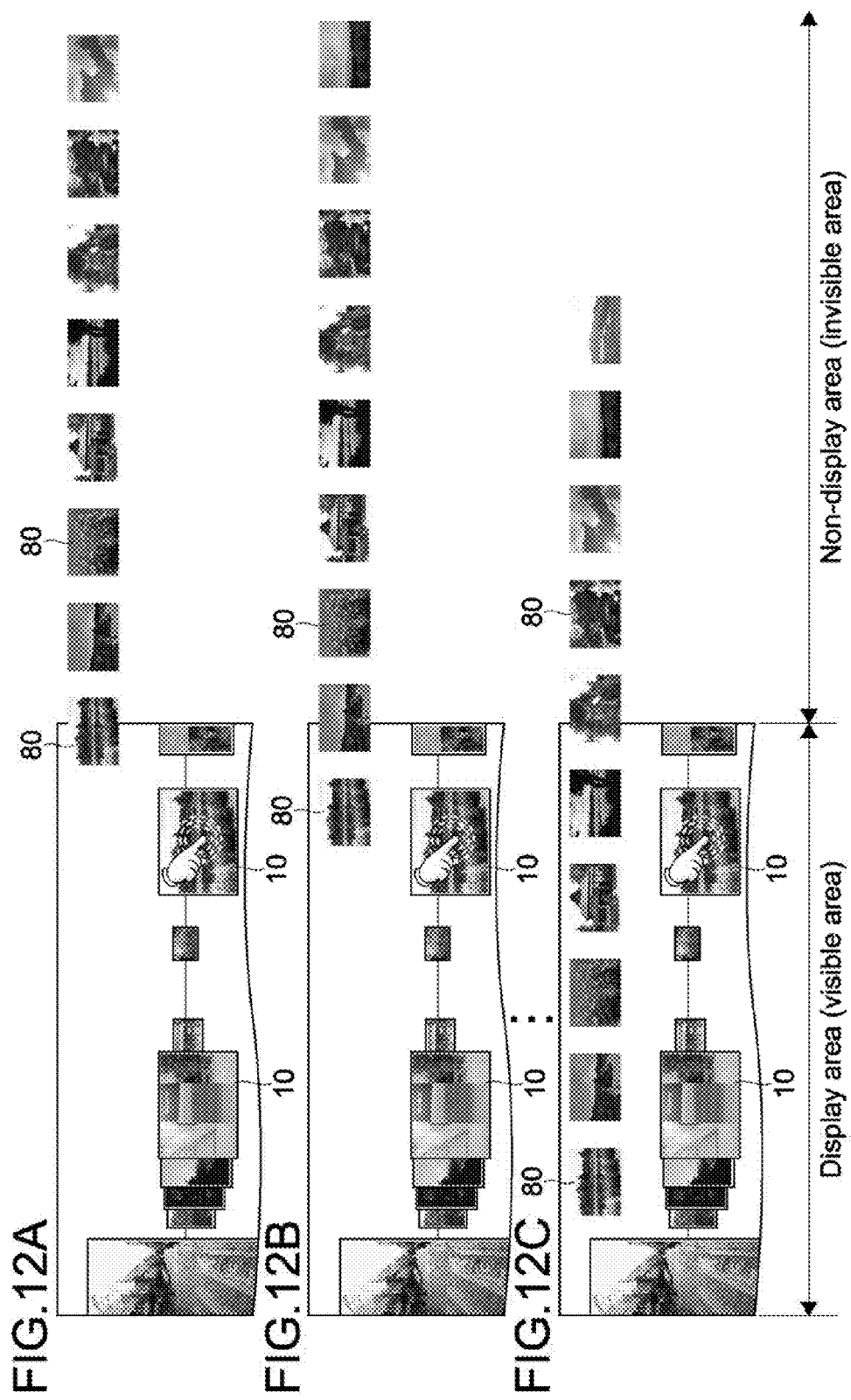

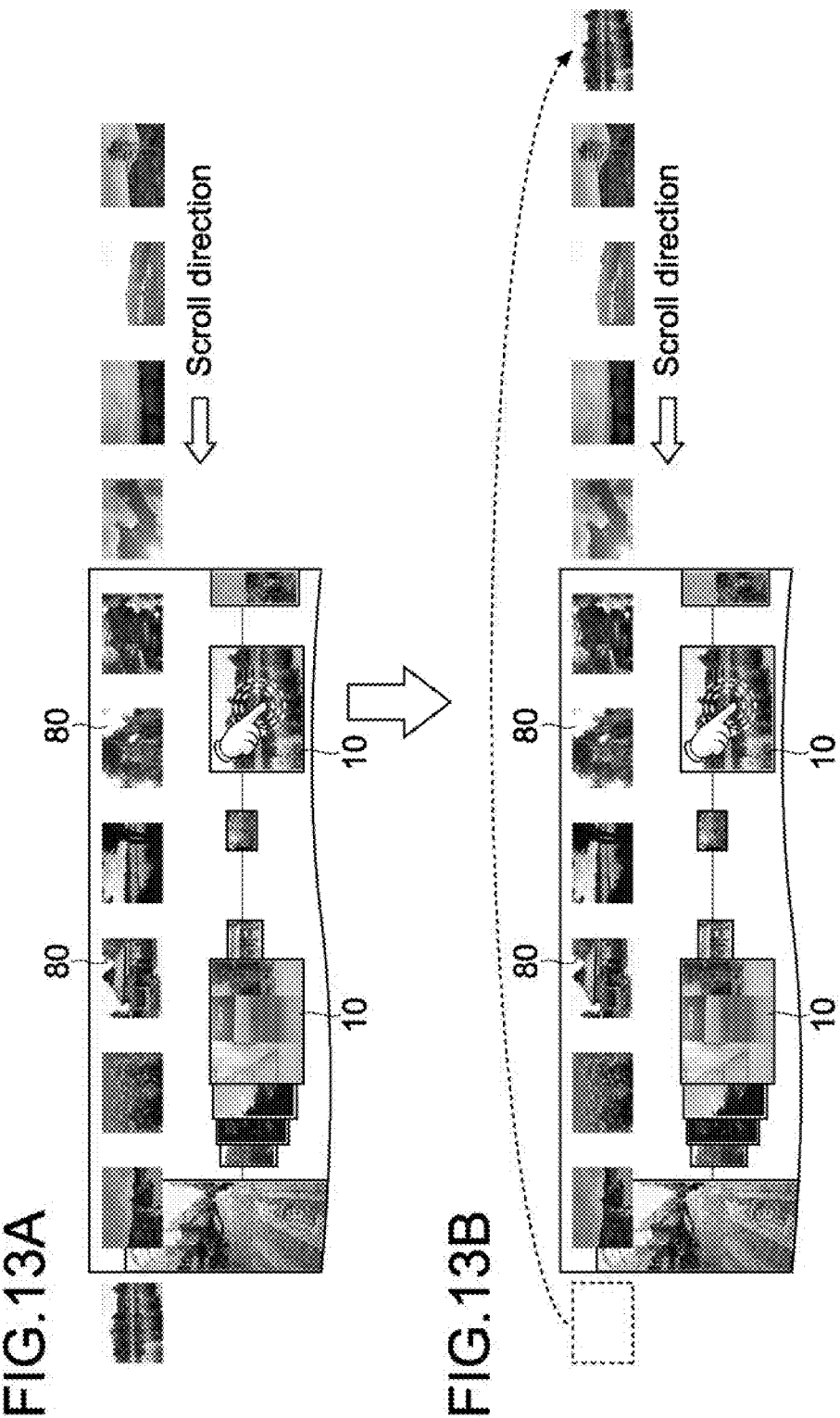

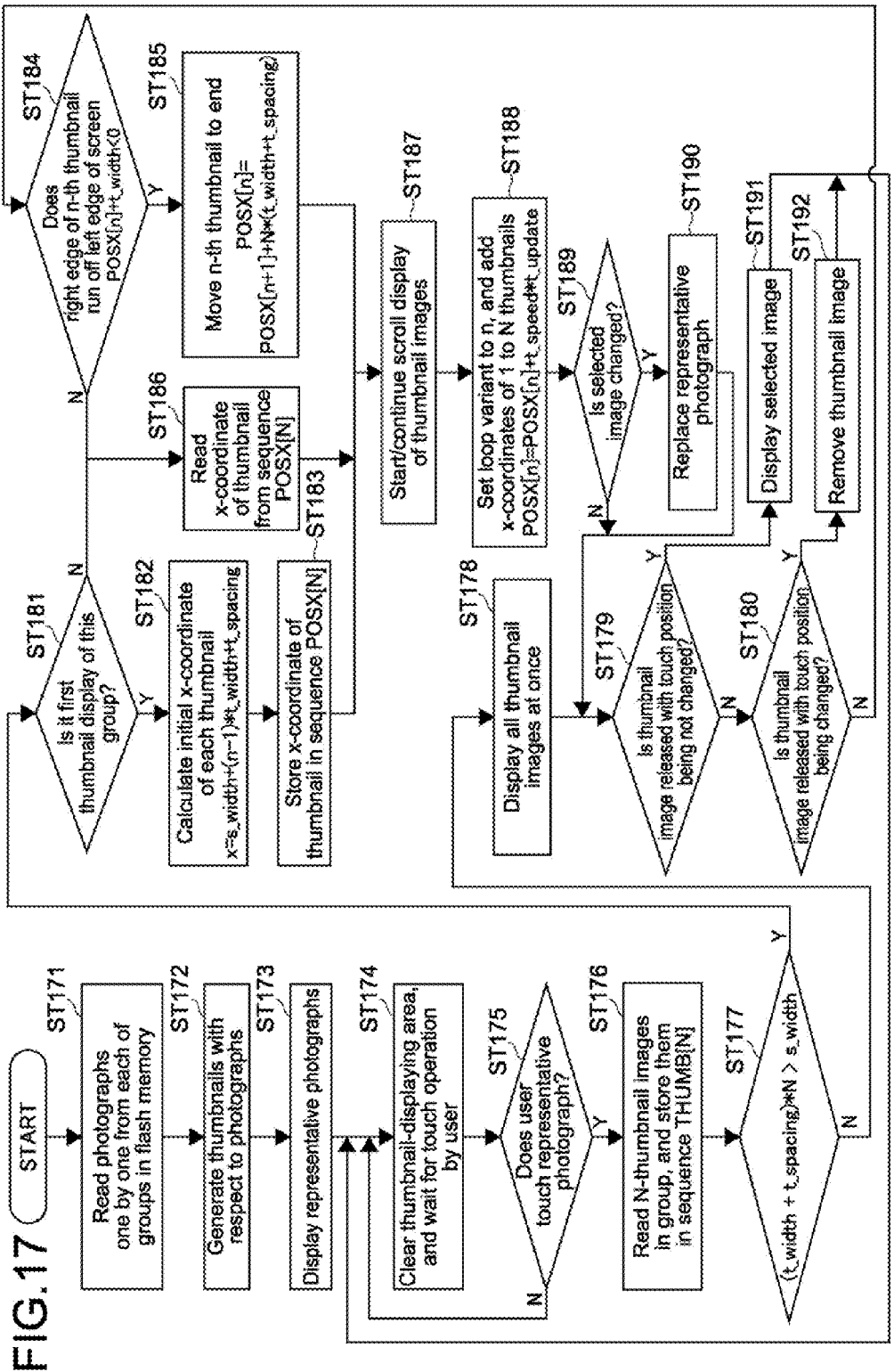

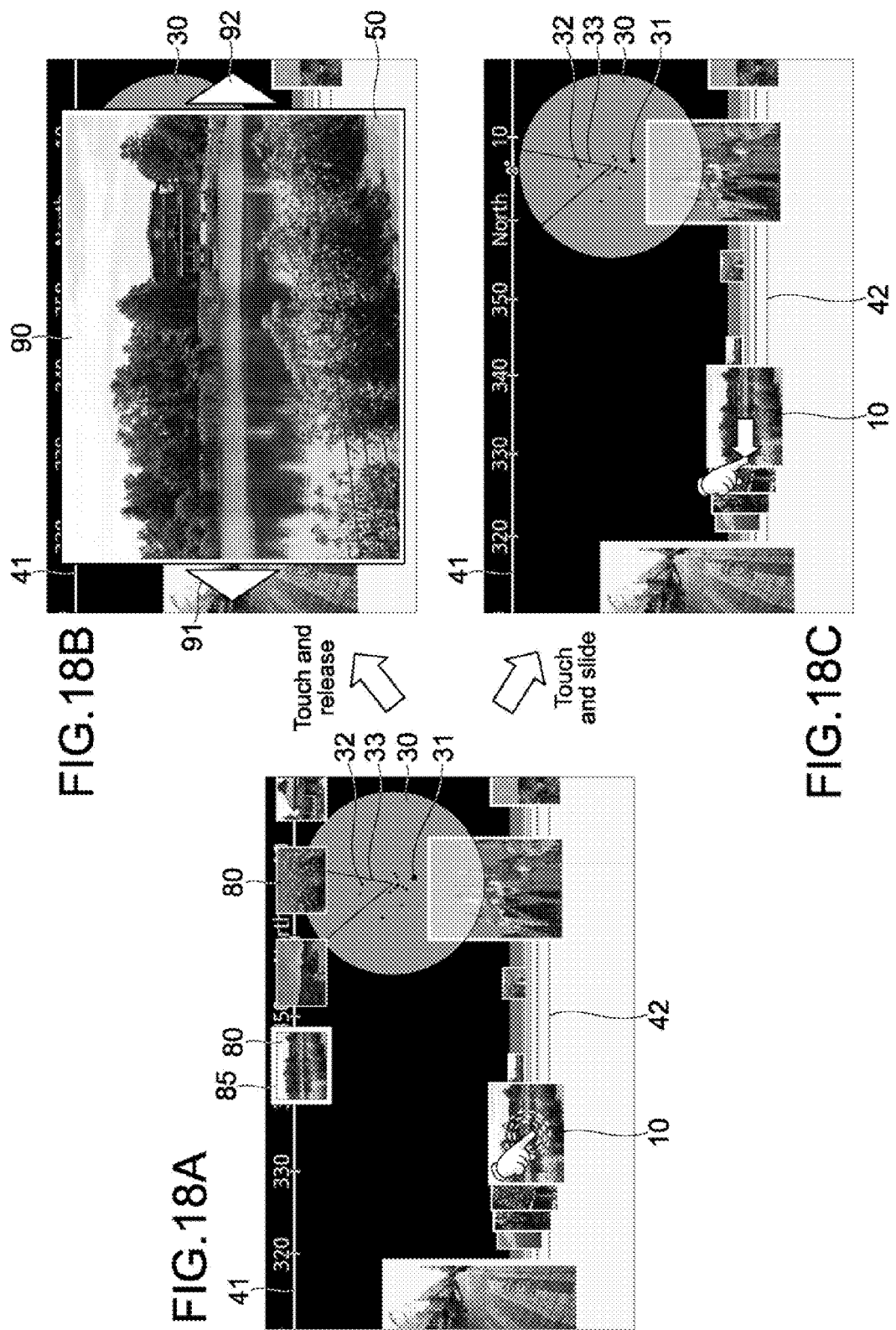

ELECTRONIC APPARATUS, IMAGE OUTPUT METHOD, AND PROGRAM THEREFOR

BACKGROUND OF THE INVENTION

1. Field of the Invention

The present invention relates to an electronic apparatus, which is capable of outputting thumbnail images of digital photograph images, to an image output method in the electronic apparatus, and to a program therefor.

2. Description of the Related Art

In the related art, digital photograph images (hereinafter, abbreviated to photographs), which are shot by a digital camera or the like, or which are obtained via a network, are classified into predetermined groups such as folders so as to be managed, which is commonly performed for example in Windows (registered mark) explorer from Microsoft (registered mark) Corporation.

Further, Japanese Patent Application Laid-open No. 2009-037082 (hereinafter, referred to as Patent Literature 1) discloses the following image viewing apparatus. Specifically, the image viewing apparatus is capable of displaying a plurality of pieces of image information as thumbnails in such a state that the plurality of pieces of image information are arranged in a raw for each of a plurality of classification items, and is capable of scroll-displaying, in a case where all pieces of image information are not displayed as thumbnails, pieces of image information not displayed.

SUMMARY OF THE INVENTION

However, in the managing method using the folders as described above, in order to view a desired photograph, a user has to perform a search operation involving screen transitions as will be described later. Specifically, the user has to open a specified folder of folder lists, and check photographs placed in the specified folder. Then, if the desired photograph is not found in that folder, the user has to return to a previous step so as to open another folder again.

Further, in the technology described in Patent Literature 1, a plurality of images are arranged in a raw for each of a plurality of classification items so as to be displayed as thumbnails. Therefore, there is a limit on the number of classification items that can be displayed on one screen (in Patent Literature 1, the number of classification items that can be displayed at once is six).

Further, in Patent Literature 1, a plurality of images for each of a plurality of classification items are displayed from the beginning. In other words, a folder is opened from the beginning. Therefore, as the number of classification items and the number of images belonging to each of the classification items is increased, a larger amount of images are displayed on the entire screen. As a result, the number of images to be displayed other than the photograph that the user desires to view is unfortunately increased. That is, for the user who desires to perform a work not for each of images belonging to each of the classification items, but for a classification item unit (folder unit), such a state in which a plurality of images are displayed from the beginning for each of a plurality of classification items is so cumbersome.

In view of the above-mentioned circumstances, there is a need for providing an electronic apparatus, which is capable of causing a user to see a preview of a plurality of images, which are classified into each of a plurality of groups, through a simple operation without deploying each of the groups, an image output method, and a program therefor.

According to an embodiment of the present invention, there is provided an electronic apparatus including a storage, an output unit, an operation detecting unit, and a controller. The storage classifies a plurality of images into a plurality of groups, and to store the classified images. The output unit outputs, as a representative image of the group, a thumbnail image of each of the images, which are extracted one by one for each of the plurality of groups from the images classified into the plurality of groups. The operation detecting unit detects a predetermined operation by the user with respect to the output representative image. The controller controls, when the predetermined operation is detected, the output unit to output each of the thumbnail images of the plurality of images classified into the group in which the representative image is extracted together with the output representative image, the thumbnail images being arranged in a predetermined direction, and to scroll each of the thumbnail images in the predetermined direction.

With this, the electronic apparatus is capable of causing the user to easily see a preview of each of the images in each of the groups without deploying each of the groups, only by allowing the user to input a first operation with respect to the representative image of each of the groups, and scrolling the thumbnail images of the images in each of the groups.

The operation detecting unit may include a touch panel provided to be integrated with the output unit. The predetermined operation may include a touch operation with respect to a position corresponding to the representative image on the touch panel. The controller may control, when the touch operation is no longer detected, the output unit to output any one image of the plurality of images classified into the group in which the representative image is extracted in place of the output representative image and each of the thumbnail images of the plurality of images.

With this, when the user finds a desired image during the scroll of the thumbnail images, the user can release the first operation at this point in time, to thereby easily deploy the group and view the desired image.

The touch panel may detect a slide operation of moving a touch position with the touch operation being continued. The controller may control, when the touch operation is no longer detected after the slide operation is detected, the output unit to stop a scroll of each of the thumbnail images of the plurality of output images and to remove each of the thumbnail images.

With this, after the user selects the representative image through the touch operation and starts the scroll, the user can release the selection and the scroll only by performing simple operations of the touch and slide operation and the touch and release operation, each of which continuously follows the touch operation.

The controller may control, when the touch operation is detected again after the touch operation is no longer detected, the output unit to restart the scroll of each of the thumbnail images of the plurality of images from a position in which the scroll is stopped.

With this, it is possible to save a step of viewing again the images already scroll-displayed when the user has been touched the representative image, when the user touches again the representative image, that the user has been touched.

The controller may control to the output unit to put, during the time when one of the thumbnail images of the plurality of the images scrolled exists at a predetermined position on the touch panel, the thumbnail image on the predetermined position into the selective state, and to remove each of the output thumbnail images and output an original image of the thumbnail image being in the selective state when the touch operation is no longer detected in the selective state.

With this, in such a manner that the user performs the touch and release when a desired thumbnail image arrives at a predetermined position during the scroll of the thumbnail images, it is possible to easily display the original image (enlarged image) of the desired thumbnail image.

The controller may control the output unit to sequentially switch the output representative image in synchronization with each of the thumbnail images in the selective state during the scroll.

With this, the electronic apparatus enable the user to easily grasp which thumbnail image is in the selective state.

The storage may store metadata of the plurality of images. The controller controls the output unit to draw the plurality of representative images at positions each corresponding to pieces of the metadata in a virtual three-dimensional space, to image the virtual three-dimensional space, and to output the imaged virtual three-dimensional space.

With this, even in a case where on the virtual three-dimensional space, the content itself of a representative image displayed so as to have a small size in a depth direction, for example, may not be viewed by the user, it is possible for the user to touch the above-mentioned representative image so as to scroll-display the thumbnail images, to thereby easily grasp the content of the representative image and the content of each of images belonging to the same group as that of the representative image.

According to another embodiment, there is provided an image output method. In the image output method, a plurality of images are classified into a plurality of groups, and the classified images are stored. A thumbnail image of each of the images, which are extracted one by one for each of the plurality of groups from the images classified into the plurality of groups, is output as a representative image of the group. A predetermined operation by the user with respect to the output representative image is detected. When the predetermined operation is detected, output is each of the thumbnail images of the plurality of images classified into the group in which the representative image is extracted together with the output representative image, the thumbnail images being arranged in a predetermined direction. Each of the thumbnail images is scrolled in the predetermined direction.

According to still another embodiment, there is provided a program configured to cause an electronic apparatus to execute a storing step, an outputting step, a detecting step, and a scrolling step. In the storing step, a plurality of images are classified into a plurality of groups, and the classified images are stored. In the outputting step, a thumbnail image of each of the images, which are extracted one by one for each of the plurality of groups from the images classified into the plurality of groups, is output as a representative image of the group. In the detecting step, a predetermined operation by the user with respect to the output representative image is detected. In the scrolling step, when the predetermined operation is detected, output is each of the thumbnail images of the plurality of images classified into the group in which the representative image is extracted together with the output representative image, the thumbnail images being arranged in a predetermined direction. Further, in the scrolling step, each of the thumbnail images is scrolled in the predetermined direction.

As described above, according to the embodiments of the present invention, it is possible to cause a user to see a preview of a plurality of images, which are classified into each of a plurality of groups, through a simple operation without deploying each of the groups.

These and other objects, features and advantages of the present invention will become more apparent in light of the following detailed description of best mode embodiments thereof, as illustrated in the accompanying drawings.

BRIEF DESCRIPTION OF DRAWINGS

FIG. 10 are explanatory views for a case where a scroll display is not performed in the embodiment of the present invention;

FIG. 11 are explanatory views for a case where the scroll display is performed in the embodiment of the present invention;

FIG. 12 are views showing a scroll conception for the thumbnail images in the embodiment of the present invention;

FIG. 13 are views showing the scroll conception for the thumbnail images in the embodiment of the present invention;

FIG. 17 is a flowchart of display processes for the thumbnail images in the embodiment of the present invention;

FIG. 18 are views showing display examples of the thumbnail images in the embodiment of the present invention.

DESCRIPTION OF PREFERRED EMBODIMENTS

Hereinafter, an embodiment of the present invention will be described with reference to the drawings.

[Hardware Configuration of Portable Terminal]

Figure 1:
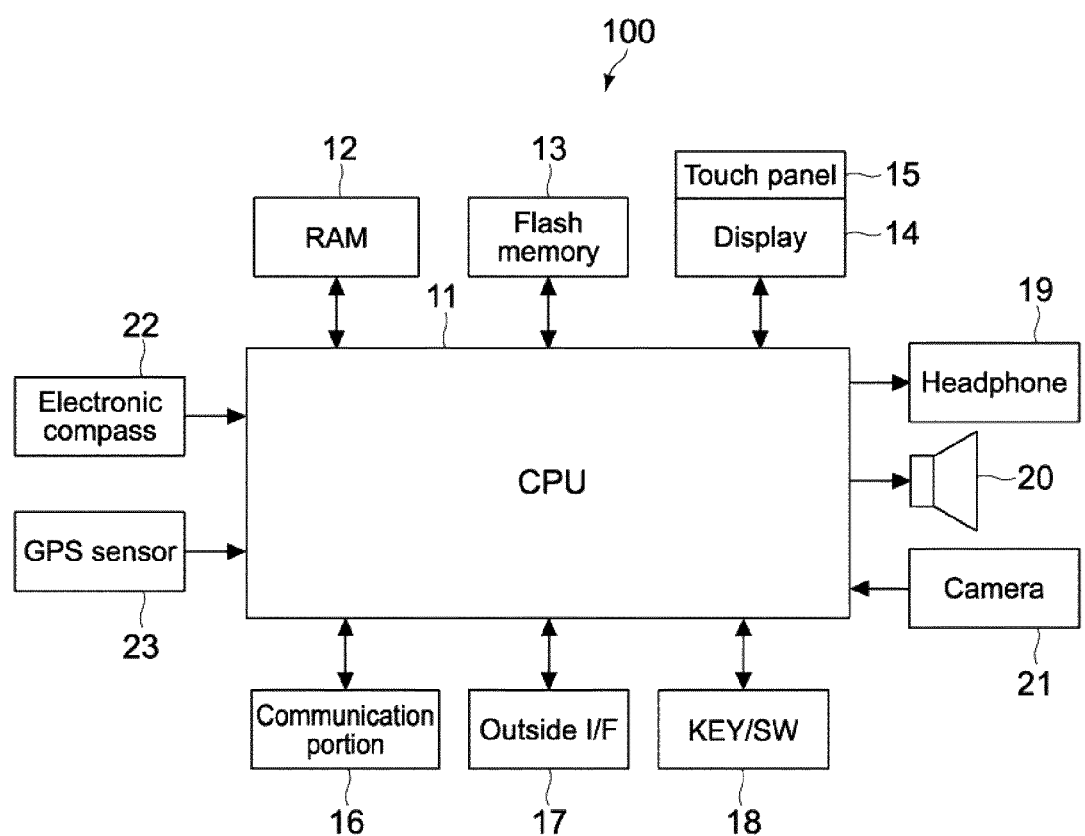
FIG. 1 is a view showing a hardware configuration of a portable terminal according to an embodiment of the present invention.

FIG. 1 is a view showing a hardware configuration of a portable terminal according to an embodiment of the present invention. Specifically, the portable terminal means a mobile phone, a smart phone, a PDA (Personal Digital Assistant), a portable type AV player, an electronic book, an electronic dictionary, or the like.

The portable terminal 100 includes a CPU 11, an RAM 12, a flash memory 13, a display 14, a touch panel 15, a communication portion 16, an outside I/F (interface) 47, a key/switch portion 18, a headphone 19, and a speaker 20. In addition, the portable terminal 100 includes a camera 21, an electronic compass 22, and a GPS (Global Positioning System) sensor 23. In addition to the above-mentioned components, the portable terminal 100 may include an antenna for a telephone call, a communication module for a telephone call, and the like.

The CPU 11 transmits and receives with respect to each of the blocks of the portable terminal 100 and performs various computing processes, to thereby control the overall processes to be performed in the portable terminal 100, such as a drawing process for digital photograph images with respect to the virtual three-dimensional space and a scroll process for thumbnails, which will be described later.

The RAM 12 is used as a working area of the CPU 11. The RAM 12 temporarily stores various pieces of data of contents and the like to be processed by the CPU 11, and programs of an application for drawing and displaying the digital photograph images in the virtual three-dimensional space (hereinafter, referred to as photograph-displaying application) and the like.

The flash memory 13 is one of an NAND type, for example. The flash memory 13 stores various contents such as the digital photograph images (hereinafter, abbreviated to photographs) shot by the camera 21 and dynamic images, a control program to be performed by the CPU 11, and various programs of the photograph-displaying application and the like. Further, the flash memory 13 reads, when the photograph-displaying application is executed, various pieces of data of photographs and the like, which are necessary for the execution, into the RAM 12. Although will be described later, the photographs are classified into a plurality of groups and stored. The various programs may be stored in another storage medium such as a memory card (not shown). Further, the portable terminal 100 may include an HDD (Hard Disk Drive) as a storage apparatus in place to or in addition to the flash memory 13.

The display 14 is, for example, an LCD or an OELD (Organic Electro-Luminescence Display) including a TFT (Thin Film Transistor) or the like, and displays images of photographs and the like. Further, the display 14 is provided so as to be integrated with the touch panel 15. The touch panel 15 detects a touch operation by a user and transmits the detected operation to the CPU 11 in such a state that the photograph and a GUI (Graphical User Interface) are displayed due to the execution of the photograph-displaying application, for example. As a method of operating the touch panel 15, for example, a resistive film method or a static capacitance method is used. However, other methods including an electromagnetic induction method, a matrix switch method, a surface acoustic wave method, an infrared method, and the like may be used. The touch panel 15 is used for allowing a user to select a photograph and perform a full-screen display or a change of the view-point thereof (zoom-in or zoom-out) during the time when the photograph-displaying application is being executed, for example.

The communication portion 16 includes, for example, a network interface card and a modem. The communication portion 16 performs a communication process with respect to other apparatuses through a network such as Internet or an LAN (Local Area Network). The communication portion 16 may include a wireless LAN (Local Area Network) module, and may include a WWAN (Wireless Wide Area Network) module.

The outside I/F (interface) 17 conforms to various standards of a USB (Universal Serial Bus), an HDMI (High-Definition Multimedia Interface), and the like. The outside I/F (interface) 17 is connected to an outside apparatus such as a memory card and transmits and receives pieces of data with respect to the outside apparatus. For example, photographs shot by another digital camera are stored through outside I/F 17 into the flash memory 13.

The key/switch portion 18 receives particularly operations by user through a power source switch, a shutter button, short cut keys, and the like, which are may be impossible to be input through the touch panel 15. Then, the key/switch portion 18 transmits input signals thereof to the CPU 11.

The headphone 19 and the speaker 20 output audio signals, which are stored in the flash memory 13 or the like, or which are input through the communication portion 16, the outside I/F 17, or the like.

The camera 21 shoots still images (photographs) and dynamic images through an image pick-up device such as a CMOS (Complementary Metal Oxide Semiconductor) sensor or a CCD (Charge Coupled Device) sensor. The shot pieces of data are stored in the RAM 12 or the flash memory 13, or are transferred through the communication portion 16 or the outside I/F 17 to another apparatus.

The camera 21 is capable of obtaining not only the shot pieces of data of the photographs and dynamic images, but also a shooting date and time and a shooting location as metadata thereof, and of storing the shooting date and time and the shooting location together with the shot pieces of data in the flash memory 13 or the like. The shooting date and time is obtained through a clock (not shown) built in the portable terminal 100. The date and time of the built-in clock may be corrected based on date and time information to be received from a base station through the communication portion 16 or on date and time information to be received from a GPS satellite by the GPS sensor 23.

The GPS sensor 23 receives GPS signals transmitted from the GPS satellite, and outputs the GPS signals to the CPU 11. Based on the GPS signals, in the CPU 11, a current location of the portable terminal 100 is detected. From the GPS signals, not only location information in a horizontal direction, but also location information (altitude) in a vertical direction may be detected. Further, without the GPS sensor 23, the portable terminal 100 may perform a trilateration between the portable terminal 100 and base stations through the wireless communication by the communication portion 16, to thereby detect the current location of the portable terminal 100.

The electronic compass 22 includes a magnetic sensor configured to detect the geomagnetism generated from the earth. The electronic compass 22 calculates an azimuth direction, to which the portable terminal 100 is oriented, based on the detected geomagnetism, and outputs the calculated azimuth direction to the CPU 11.

[Relation Between Photographs and Group]

Figure 2:
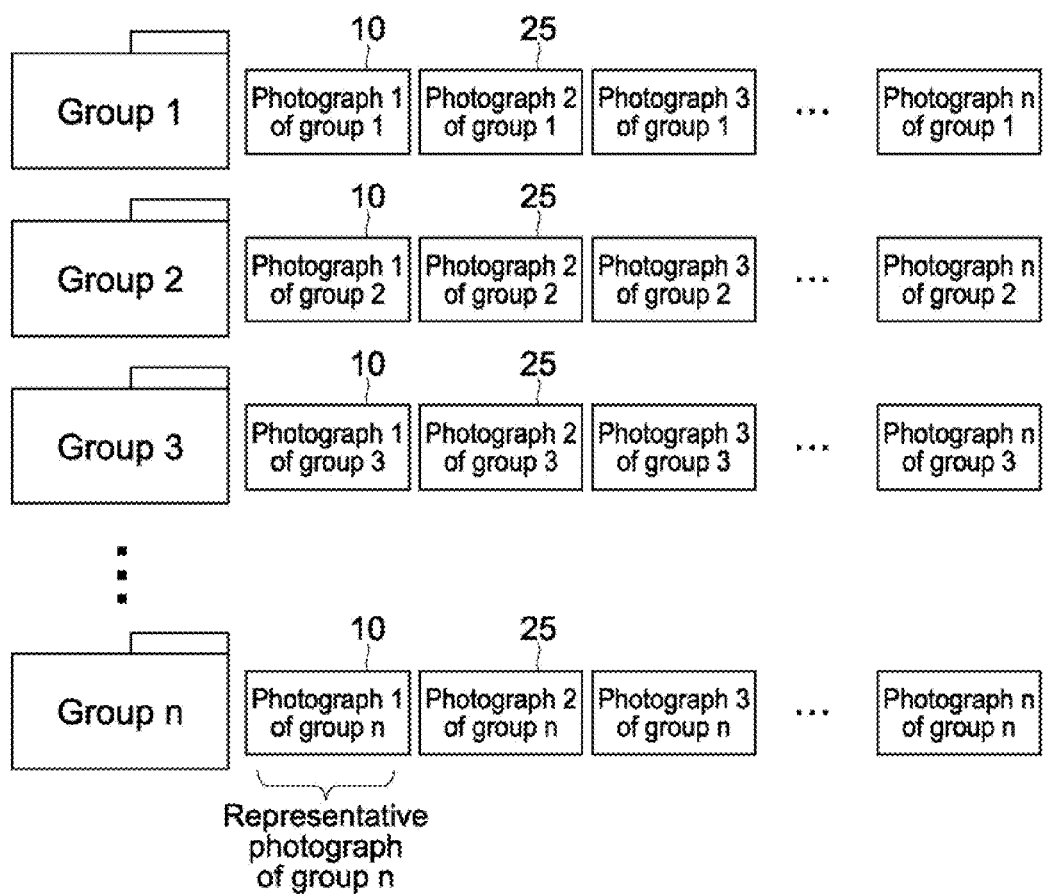
FIG. 2 is a view showing a relation between photographs and each group in the embodiment of the present invention.

Next, the description will be made of a relation between the photographs and each group. FIG. 2 is a view showing the relation between the photographs and the group.

As shown in FIG. 2, the photographs 25 stored in the flash memory 13 or the like are classified into a plurality of groups according to the shooting date and time or other attributes or according to user's selection. The "group" has the same conception as "folder" in Windows (registered mark) or Mac (registered mark) OS in the related art.

The photographs 25 belonging to the group are sorted by an arbitrary algorism such as the order of shooting date and time, for example. As a result of the sorting, a photograph 25 positioned at the head in each of the groups is set as a representative photograph 10.

[Virtual Three-Dimensional Space]

In this embodiment, the portable terminal 100 is capable of drawing (arranging) the representative photograph 10 of each group of the plurality of photographs 25, which are grouped and stored, in the virtual three-dimensional space, and of displaying the virtual three-dimensional space in which the representative photographs 10 are drawn, as a two-dimensional image. In the following, the description will be made of the virtual three-dimensional space.

Figure 3:
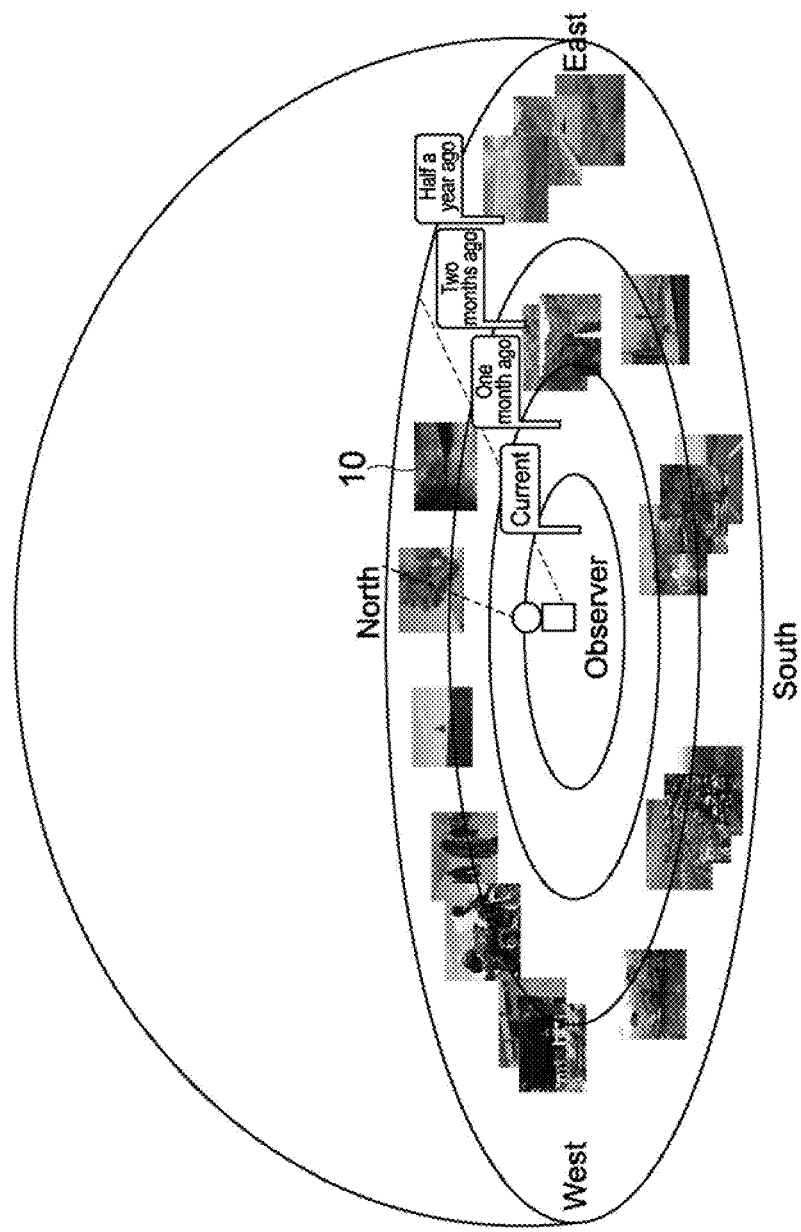
FIG. 3 is a view conceptually showing a virtual three-dimensional space displayed in the embodiment of the present invention.

FIG. 3 is a view conceptually showing the virtual three-dimensional space in this embodiment. Further, FIG. 4 is a view conceptually showing the virtual three-dimensional space displayed through the display 14 in this embodiment.

As shown in FIG. 3, the following semi-spherical virtual three-dimensional space in 360° is assumed. Specifically, in the semi-spherical virtual three-dimensional space, a concentric circle is drawn about an observer (view-point of user of portable terminal 100), a radial direction of the concentric circle is set to correspond to a depth direction, and a circumferential direction is set to correspond to the azimuth direction. The portable terminal 100 arranges each of the representative photographs 10 at a position in the virtual three-dimensional space, the position corresponding to the shooting date and time and the shooting location of the representative photograph 10. The portable terminal 100 draws and displays the virtual three-dimensional space in such a manner that the virtual three-dimensional space looks like a background as seen from the view-point of the user as shown in FIG. 3.

Figure 4:
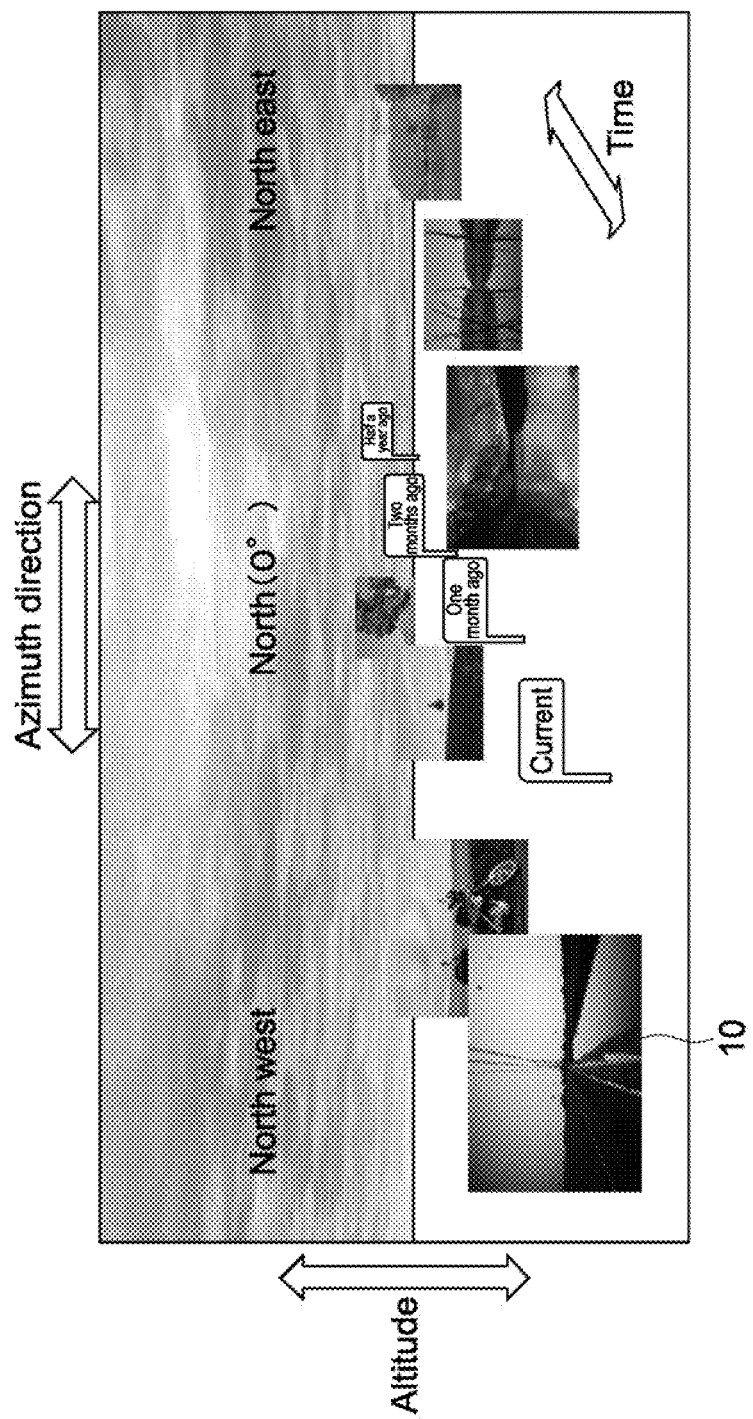
FIG. 4 is a view conceptually showing a display mode of the virtual three-dimensional space in the embodiment of the present invention.

In this embodiment, as shown in FIG. 4, a horizontal axis of the virtual three-dimensional space corresponds to the azimuth direction, a vertical axis of the virtual three-dimensional space corresponds to the altitude, and a depth axis of the virtual three-dimensional space corresponds to a time. Specifically, the horizontal axis indicates the azimuth direction to the location where the representative photograph 10 has been shot, as seen from the current location of the portable terminal 100. Further, the depth axis indicates the date and time when the representative photograph 10 has been shot, while a current date and time is set as a reference point. Further, the vertical axis indicates the elevation above the earth's surface at the location where the representative photograph 10 has been shot. In a case where the altitude information is not recorded together with the representative photograph 10, the altitude thereof is set to 0, and the representative photograph 10 is arranged along the earth's surface (bottom surface of virtual three-dimensional space).

A time interval arranged to the depth direction may be a fixed interval including one hour interval, or one day interval, and the like. Alternatively, the time interval arranged to the depth direction may be a variable interval. In this case, as a distance from the view-point becomes larger, for example, one hour, one day, one year, ten years, and so on, the interval becomes larger in an exponential manner. In both of FIG. 3 and FIG. 4, the example in which the variable interval is used is shown.

In this display mode, the virtual three-dimensional space has a perspective in the depth direction. Thus, on the display 14, the size of the representative photograph 10 is varied correspondingly to an interval between the current date and time and the shooting date and time of each of the representative photographs 10 when the representative photographs 10 are displayed. Meanwhile, in the vertical axis direction, the virtual three-dimensional space has no perspective. Thus, even when the altitudes of the representative photographs 10 are different from each other, the representative photographs 10 are displayed with the same size as long as the shooting date and time of each of the representative photographs 10 is the same. Further, in the vertical axis direction, the representative photographs 10 each having such an altitude that the representative photograph 10 departs from a range in which the display 14 is capable of displaying the representative photographs 10 can be displayed through an upper and lower scroll operation by the user, for example. However, a display mode in which the virtual three-dimensional space has a perspective also in the vertical axis direction may be employed.

Actually, the representative photographs 10 displayed in those drawings are thumbnail images obtained by reducing the representative photographs 10 stored in the flash memory 13 into a predetermined size. However, in order to discriminate the thumbnail images of the representative photographs 10 from thumbnail images to be scroll-displayed in addition to the above-mentioned representative photographs 10, which will be described later, the thumbnail images of the representative photographs 10 described above are referred to as "representative photographs" for convenience.

A display mode of the virtual three-dimensional space is not limited to the display mode as described above. For example, in the virtual three-dimensional space, it is also possible that the horizontal axis correspond to the azimuth direction, the vertical axis correspond to the time, and the depth axis correspond to the distance (distance between portable terminal 100 and current location). That is, it is also possible that the horizontal axis indicate the azimuth direction to the location where each of the representative photographs 10 has been shot as seen from the current location of the portable terminal 100, the vertical axis indicate the shooting date and time of the representative photograph 10, and the depth axis indicate the distance between the current location of the portable terminal 100 and the location where the representative photograph 10 has been shot.

[Display Process Procedures of Virtual Three-Dimensional Space]

Next, the description will be made of an operation of the portable terminal 100 configured in the above-mentioned manner.

Figure 5:
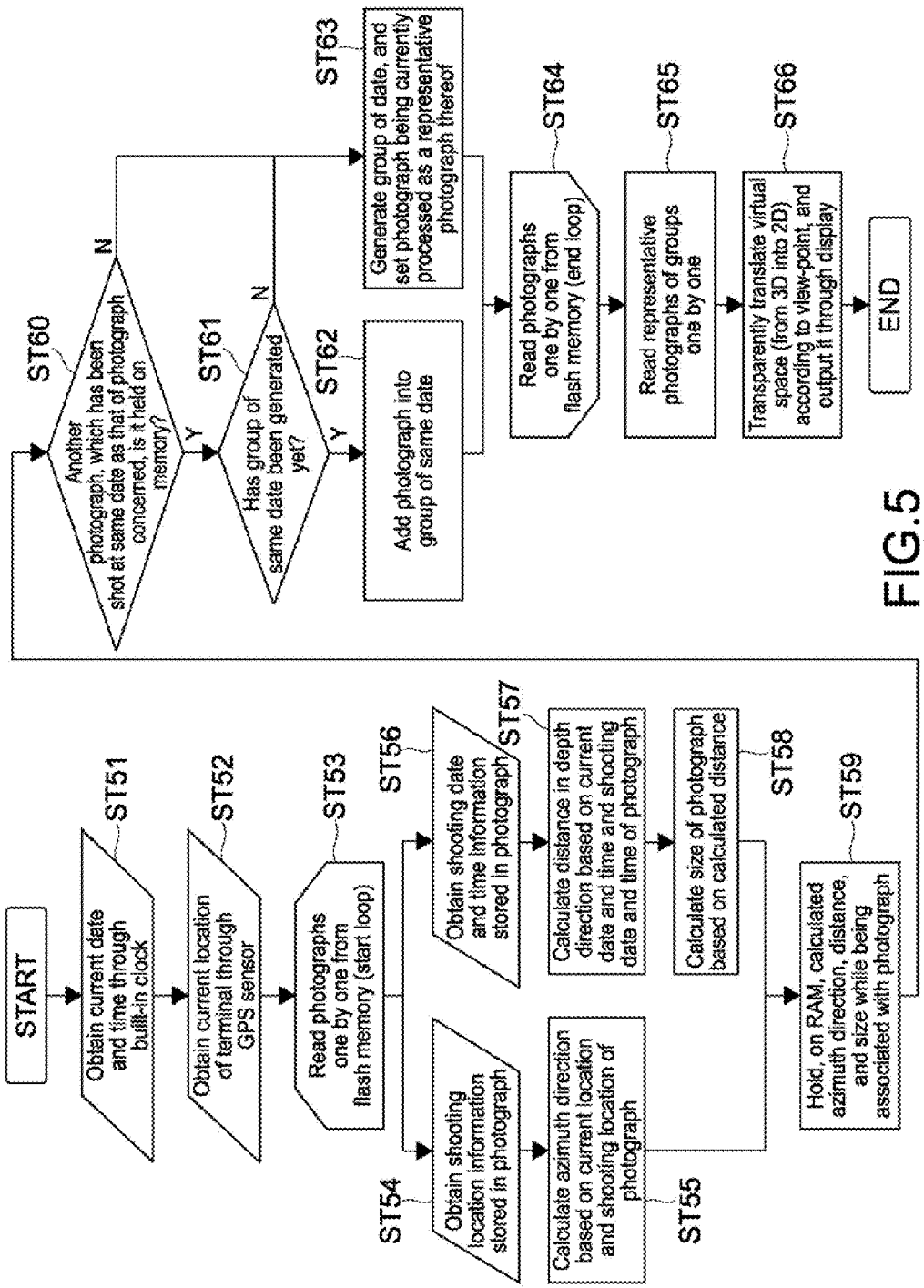
FIG. 5 is a flowchart of display processes for the virtual three-dimensional space in the embodiment of the present invention.

First, the description will be made of display processes for the virtual three-dimensional space shown in FIG. 3 and FIG. 4. FIG. 5 is a flowchart of the display processes. Although the description of the flowchart will be made on the assumption that the CPU 11 of the portable terminal 100 is one that mainly performs the operation, the operation is actually performed in cooperation with the photograph-displaying application and other programs, which are executed under the control of the CPU.

As shown in FIG. 5, the CPU 11 of the portable terminal 100 first obtains the current date and time through the built-in clock (Step 51). Subsequently, the CPU 11 of the portable terminal 100 obtains the current location of the portable terminal 100 through the GPS sensor 23 (Step 52).

Subsequently, the CPU 11 reads the photographs 25 one by one from the flash memory 13, and starts a loop process with respect to each of the photographs 25 (Step 53). In the loop process, the CPU 11 obtains the shooting location information stored in the photograph 25 (Step 54). Then, based on the current location and the shooting location information of the photograph 25, the azimuth direction of the photograph 25 is calculated (Step 55). Further, the CPU 11 obtains the shooting date and time information stored in the photograph 25 (Step 56). Then, the CPU 11 calculates, based on the current date and time and the shooting date and time information of the photograph 25, a distance in the depth direction (Step 57). In addition, the CPU 11 calculates the size of the representative photograph 25 to be drawn in the virtual three-dimensional space, based on the calculated distance in the depth direction (Step 58).

Here, the representative photograph 10 is set to have a constant size L. Specifically, in a case where the photograph 10 is positioned at the distance r, an azimuth direction angle θ(°) from the view-point, the portable terminal 100 draws the representative photograph 10 with the size L at a coordinate P(xp,yp,zp)=(r cos θ,0,r sin θ). In this case, when the virtual three-dimensional space is transparently translated into a two-dimensional image in a field of view V from the view-point, as the distance r becomes smaller, the representative photograph 10 is displayed with a larger size, and as the distance r becomes larger, the representative photograph 10 is displayed with a smaller size.

However, the CPU 11 may draw the representative photograph 10 in such a manner that the size of the representative photograph 10 increases in proportion to the distance r. In this case, when the virtual three-dimensional space is transparently translated into a two-dimensional image in the field of view V from the view-point, any representative photographs 10 are displayed with substantially the same size irrespective of the distance r.

Further, as a method of converting the shooting date and time of the representative photograph 10 into the distance r in the depth direction, there is used a method in which the shooting date and time and the distance r correspond to each other in a ratio of 1:1, for example. However, for example, the distance r may be determined by not the shooting date and time, but the shooting order. That is, the CPU 11 may arrange the representative photographs 10 according to the shooting order of each of the representative photographs 10 at predetermined intervals.

Referring back to FIG. 5, the CPU 11 holds on the RAM 12 the azimuth direction, the distance, and the size, which are thus calculated while being associated with the photograph (Step 59). Here, in a case where the information of the altitude can be obtained from the photograph, the CPU 11 calculates, based on the current location and the altitude, a position in the y-axis of the photograph 25, and holds on the RAM 12 the position together with the azimuth direction, the distance, and the size while being associated with the photograph 25.

Subsequently, the CPU 11 determines whether or not another photograph 25, which has been shot at the same date as that of the photograph 25 being currently processed in the loop process, is held on the RAM 12 (Step 60). In a case where it is determined that another photograph 25, which has been shot at the same date as that of the photograph 25 being currently processed in the loop process, is held on the RAM 12 (Yes), the CPU 11 determines whether or not a group of the same date has already been generated (Step 61). It is determined that the group of the same date has already been generated (Yes), the CPU 11 adds, in the group of the same date, another photograph 25, which has been shot at the same date as that of the photograph 25 being currently processed in the loop process (Step 62).

In a case where it is determined in Step 60 that another photograph 25, which has been shot at the same date as that of the photograph 25 being currently processed in the loop process, is not held on the RAM 12 (No), and in a case where it is determined in Step 61 that the group of the same date has not yet been generated (No), the CPU 11 generates a new group of the above-mentioned date, and sets the photograph 25 being currently processed as a representative photograph of that group (Step 63).

The CPU 11 repeats the above-mentioned loop process with respect to all photographs 25 stored in the flash memory 13 (Step 64).

Then, the CPU 11 reads the representative photographs 10 of each group, which are thus generated, one by one (Step 65). Further, the CPU 11 outputs the virtual three-dimensional space in which the photographs are drawn in such a manner that each of the representative photographs 10 is arranged at a position corresponding to the azimuth direction, the distance, and the size, which are held on the RAM 12, generates a two-dimensional image through transparently translating the three dimensional into the two-dimensional according to the current view-point, and outputs the two-dimensional image through the display 14 (Step 66).

[Display Example of Virtual Three-Dimensional Space]

Figure 6:
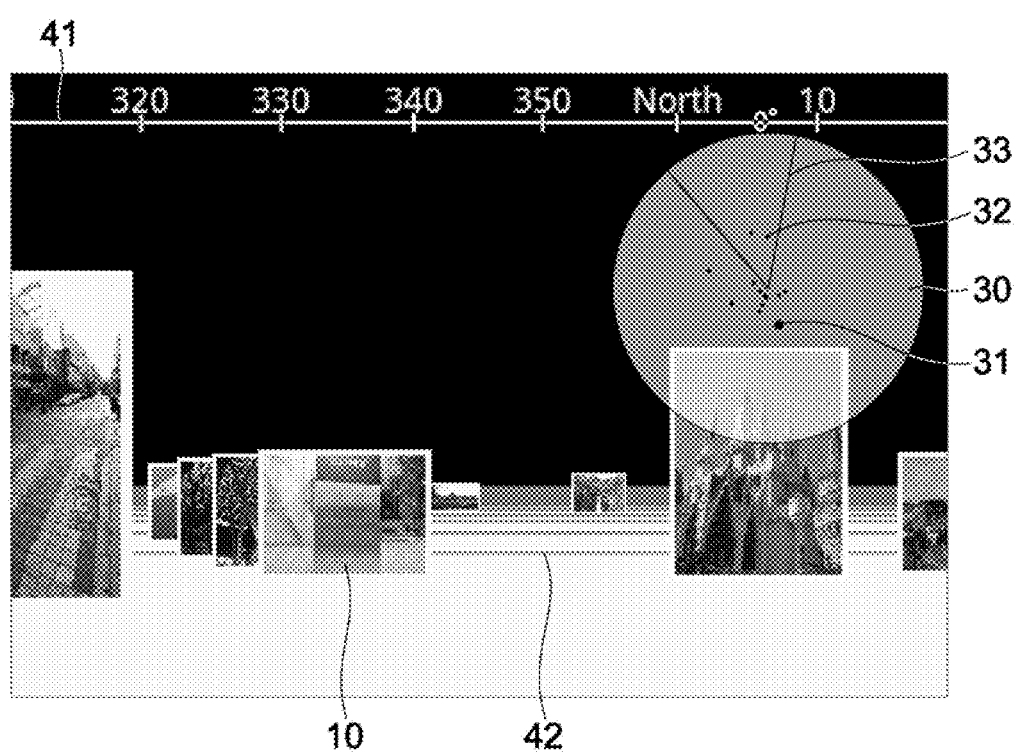
FIG. 6 is a view showing an output example of the virtual three-dimensional space in the embodiment of the present invention.

Now, the description will be made of an actual display example of the virtual three-dimensional space to be output to the display 14 according to the above-mentioned processes. FIG. 6 is a view showing the display example.

FIG. 6 is an output example in a case where the portable terminal 100 is oriented to the azimuth direction of the north. As shown in FIG. 6, the output image of the virtual three-dimensional space includes, in addition to the images of the photographs 10, an overhead-view navigation image 30, a number line image 41, and a horizontal line image 42.

The overhead-view navigation image 30 shows the virtual three-dimensional space overhead-viewed from the direction of the y-axis. The overhead-view navigation image 30 includes a view-point displaying point 31, position displaying points 32, and view-range displaying lines 33. The view-point displaying point 31 indicates a view-point. Each of position displaying points 32 indicates a drawing position of each of the photographs 10. The view-range displaying lines indicate a view range from the view-point. With the overhead-view navigation image 30, the user can intuitively grasp a position in the entire virtual three-dimensional space and a current range of a field of view of the user, while the user is locally viewing each of the photographs per the azimuth direction and per a time.

The number line image 41 indicates the azimuth direction angle corresponding to the above-mentioned range of the field of view. At positions respectively corresponding to azimuth direction angles of 0° (360°), 90°, 180°, and 270°, characters referring to the azimuth directions such as North, East, South, and West are indicated instead of the azimuth direction angles. With this, the user can easily and correctly grasp which azimuth direction the current range of the field of view of the user corresponds to.

The portable terminal 100 is capable of switching between display and non-display of the overhead-view navigation image 30, the number line image 41, and the horizontal line image 42 according to user's selection.

In this embodiment, the portable terminal 100 is capable of moving the position of the view-point in the virtual three-dimensional space to a position being far away from the center, for example, according to the operation by the user. FIG. 6 is a view showing the output example in a case where the view-point is moved (zoomed out) from the center backwardly (to south).

[Scroll Display Process for Thumbnail Images]

In this embodiment, the portable terminal 100 is capable of scroll-displaying thumbnail images of a plurality of photographs 25 belonging to a group represented by each of the representative photographs 10 in the displayed the virtual three-dimensional space. In the following, the description will be made of the scroll display process.

(Thumbnail Image-Displaying Area)

First, the description will be made of an area in which the thumbnail images are to be displayed. FIG. 7 are explanatory views for the area in which the thumbnail images are to be displayed.

Figure 7A:
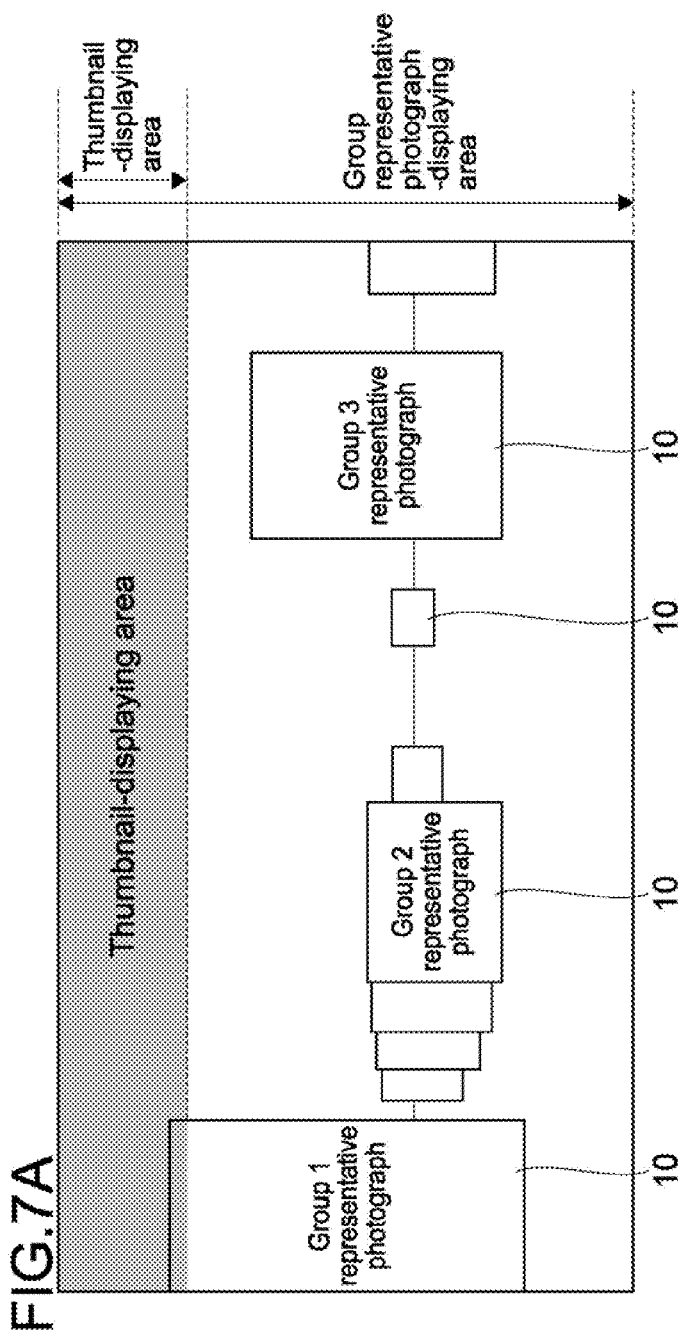
FIG. 7 are explanatory views for an area in which thumbnail images are to be displayed in the embodiment of the present invention.

As shown in FIG. 7A, the entire display area of the display 14 is used as an area in which the representative photographs 10 are displayed. Meanwhile, a horizontally long rectangular area, being an upper portion of the entire display area of the display 14, is used as the area in which the thumbnail images are to be displayed (hereinafter, referred to as thumbnail-displaying area).

Figure 7B:
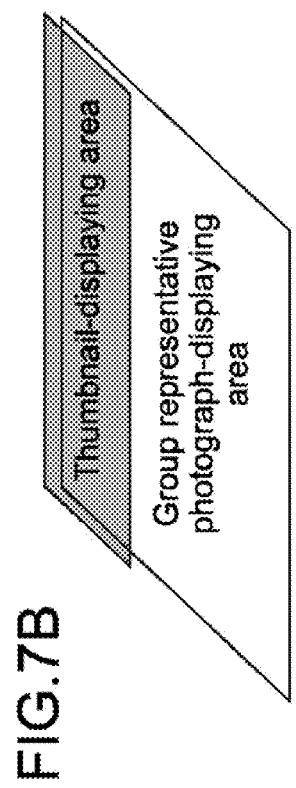

The thumbnail-displaying area overlaps a part of the area in which the representative photographs 10 are to be displayed. As shown in FIG. 7B, the thumbnail-displaying area is arranged in front of the area in which the representative photographs 10 are displayed, and hence in the overlapping portion, the representative photographs 10 are displayed in a semi-transparent state, for example.

(Outline of Display Process for Thumbnail Images)

Figure 8:
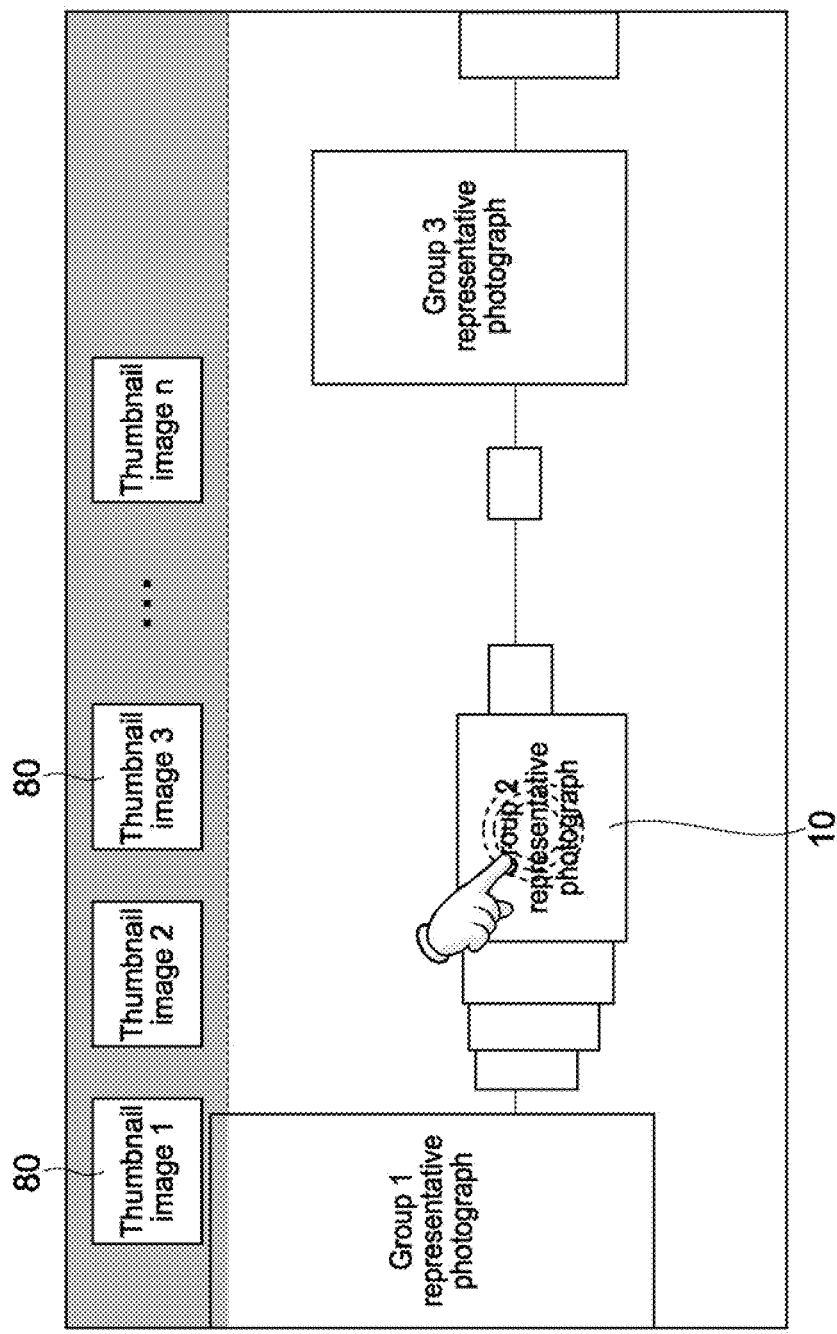
FIG. 8 is a view conceptually showing a display process for the thumbnail images in the embodiment of the present invention.

Next, the description will be made of an outline of the display processes for the above-mentioned thumbnail images. FIG. 8 is a view conceptually showing a display process for the thumbnail images.

As shown in FIG. 8, when the user touches a representative photograph 10 of each of the groups for a predetermined time period (for example, 0.5 seconds) or more after the virtual three-dimensional space is displayed on the display 14 (touch panel 15), the photograph-displaying application displays the thumbnail images 80 of the photographs 25 belonging to a group represented by the representative photograph 10 in the thumbnail-displaying area. Each of the thumbnail images 80 is sequentially scrolled to a predetermined direction, for example, from the right to the left on the display 14. A lead thumbnail image 80 is set to be a thumbnail image being the same as the representative photograph 10.

(Scroll Condition of Thumbnail Images)

Figure 9:
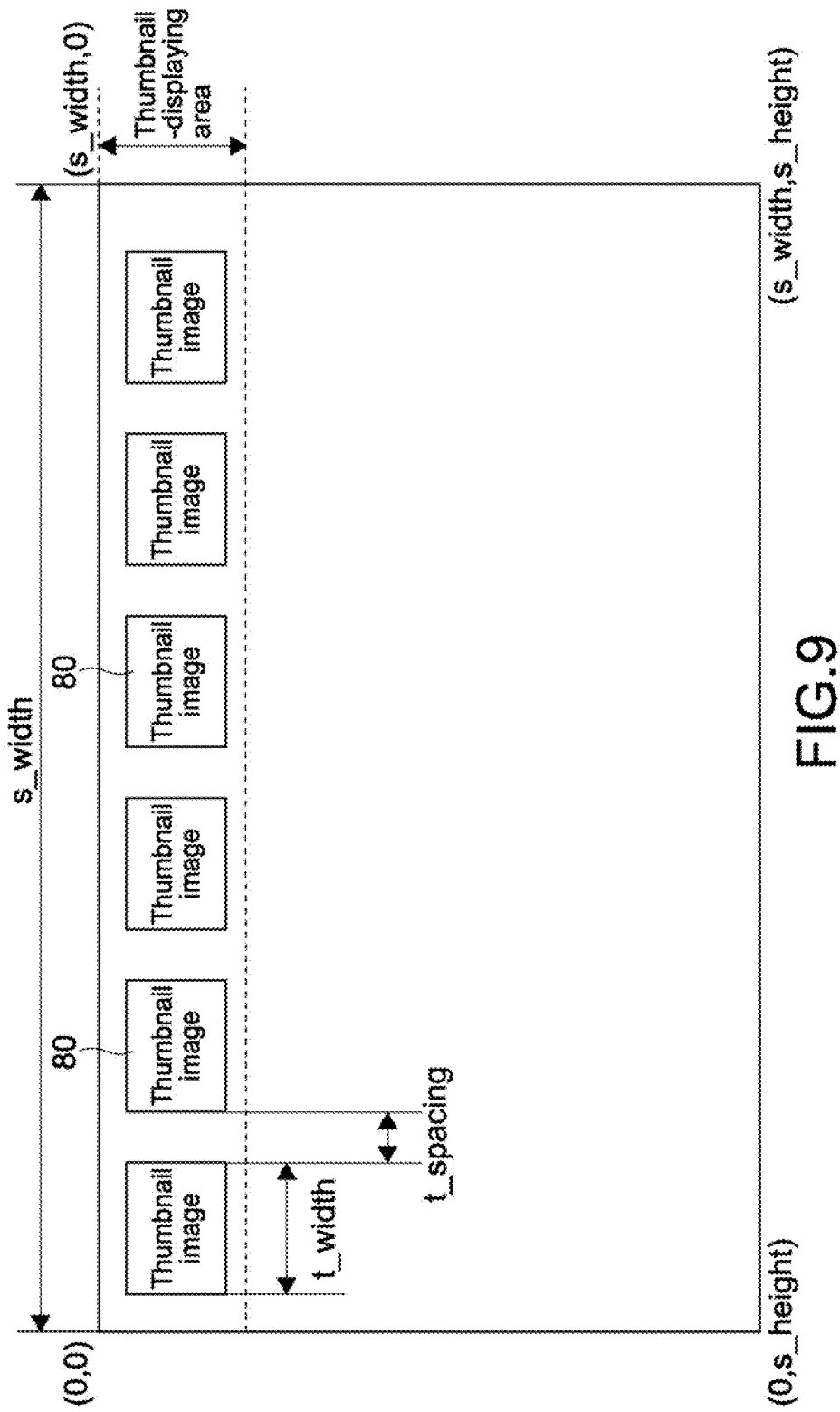
FIG. 9 is a view showing the definition of values to be used in a scroll display process in the embodiment of the present invention.

Next, the description will be made of a condition in which the thumbnail images 80 are scrolled. FIG. 9 is a view showing the definition of values to be used in the scroll display process.

As shown in FIG. 9, a width of each of the thumbnail images 80 is indicated by t_width(pixel), an interval between the thumbnail images 80 is indicated by t_spacing (pixel), and a width of the thumbnail-displaying area is indicated by s_width(pixel) (equal to width of display area of display 14 in this embodiment). Further, the number of photographs 25 belonging to an arbitrary group is indicated by N, and a scroll speed of the thumbnail images 80 is indicated by t_speed(pixel/second).

Further, as shown in FIG. 9, the display area of the display 14 is considered to have the following coordinate system: a coordinate of an upper left corner is set to (0, 0), that is, a point of origin, a coordinate of an upper right corner is set to (s_width, 0), a lower left corner is set to (0, s_height), and a lower right corner is set to (s_width, s_height). As described above, in this embodiment, each of the thumbnail images 80 is scrolled from the right to the left, and hence the scroll speed t_speed has a negative value. Further, an interval of updating the screen of the display 14 is indicated by t_update (second).

On the above-mentioned assumption, the photograph-displaying application determines whether or not the thumbnail image 80 is scroll-displayed according to whether or not the expression of (t_width+t_spacing)*≤s_width is established. FIG. 10 are explanatory views for a case where the scroll display is not performed. FIG. 11 are explanatory views for a case where the scroll display is performed.

FIG. 10A shows a state of the thumbnail-displaying area in a case where the scroll display is not performed when a representative photograph 10 is touched. FIG. 10B shows photographs 25 in a group represented by the representative photograph 10 in such a case. As shown in FIG. 10, the photograph-displaying application does not perform the scroll display in a case where the expression of (t_width+t_spacing)*N≤s_width is established.

That is, in the case where the above-mentioned expression is established, even when the photograph-displaying application converts N photographs 25 belonging to an arbitrary group into thumbnails and the N thumbnail images are arranged in the thumbnail-displaying area, all of them can be accommodated in the thumbnail-displaying area. Thus, in the above-mentioned case, the photograph-displaying application displays the N thumbnail images 80 in the thumbnail-displaying area at a time without scrolling the thumbnail images 80.

FIG. 11A shows a state of the thumbnail-displaying area in a case where the scroll display is performed when a representative photograph 10 is touched. FIG. 11B shows photographs 25 in a group represented by the representative photograph 10 in such a case. As shown in FIG. 11, the photograph-displaying application performs the scroll display in a case where the expression of (t_width+t_spacing)*N>s_width is established.

That is, in the case where the above-mentioned expression is established, even when the photograph-displaying application converts N photographs 25 belonging to an arbitrary group into thumbnails and tries to arrange all of the N thumbnail images in the thumbnail-displaying area, all of the N thumbnail images may not be accommodated in the thumbnail-displaying area and depart from that area. Thus, in the above-mentioned case, the photograph-displaying application scrolls the thumbnail images 80 from the right to the left so as to display all of the thumbnail images 80 of the N photographs belonging to that group in the thumbnail-displaying area.

(Scroll Conception of Thumbnail Images)

FIG. 12 and FIG. 13 are views each showing a scroll conception of the thumbnail images 80.

As shown in FIG. 12, the photograph-displaying application scrolls the thumbnail images 80 of the photographs 25 in the group, during the time when the representative photograph 10 is touched, from a right edge to a left direction of the thumbnail-displaying area one by one in order from the lead thumbnail image 80 to an end thumbnail image 80. As described above, the thumbnail images 80 may be scrolled from a left edge to a right direction of the thumbnail-displaying area. Alternatively, the user may arbitrarily specify both scroll directions described above. Further, in a case where a representative photograph 10 of a group is touched first time, the position of the lead thumbnail image 80 when the scroll is started (initial starting position) may not be at the edge of the thumbnail-displaying area.

As shown in FIG. 12, thumbnail images 80, which depart from the thumbnail-displaying area (visible area) when displayed, exist in a non-display area (invisible area). Here, each of the thumbnail images 80 is moved by T*t_speed (pixel) due to the scroll T seconds after the thumbnail images are started to be displayed. Thus, provided that the number of thumbnail images 80 to be displayed in the thumbnail-displaying area is indicated by VISIBLE_CNT and that the number of thumbnail images 80 not to be displayed in the thumbnail-displaying area is indicated by INVISIBLE_CNT, both are determined by the following expression.

VISIBLE_$CNT$=($T$*$t$_speed)/($t$_width+$t$_spacing)

INVISIBLE_$CNT$=$N$−VISIBLE_$CNT$

When the representative photographs 10 are scrolled for a predetermined time according to the processes shown in FIG. 12, the thumbnail image 80 as the lead image departs from the thumbnail-displaying area as seen in FIG. 13A. In this case, as shown in FIG. 13B, the photograph-displaying application rearranges the departing thumbnail image 80 to the end of the thumbnail images 80 existing in the non-display area.

Also when the subsequent thumbnail image 80 depart from the thumbnail-displaying area, the photograph-displaying application rearranges the departing thumbnail image 80 to the end of the thumbnail images 80 existing in the non-display area. In this manner, each of the thumbnail images 80 is caused to perform an operation of circulating between the thumbnail-displaying area and the non-display area.

(Choice of Thumbnail Image)

Figure 14:
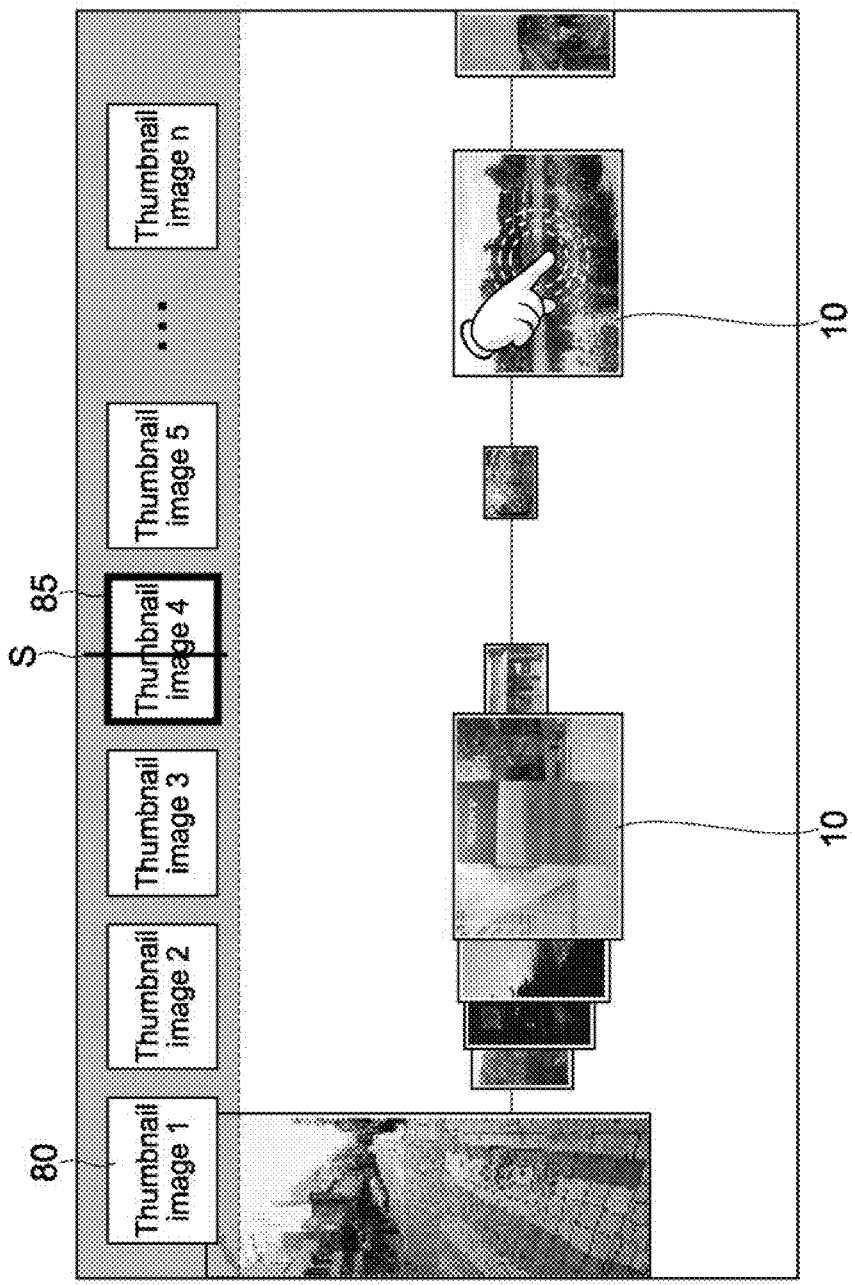
FIG. 14 is a view showing a conception of a selecting method for the thumbnail images in the embodiment of the present invention.

Next, the description will be made of a method of selecting one of the thumbnail images 80 being scrolled. FIG. 14 is a view showing a conception of the selecting method. FIG. 15 are views showing transitions over time of the thumbnail images 80 to be selected.

As shown in FIG. 14, the photograph-displaying application virtually sets a scan line S as a reference line for selecting one of the thumbnail images 80, for example, in a substantially center of the thumbnail-displaying area. Actually, the scan line S is not displayed in the thumbnail-displaying area. Further, the position of the scan line S is not limited to the center.

During scrolling the thumbnail images 80, when a part of one of the thumbnail images 80 passes over the scan line S, the photograph-displaying application puts the thumbnail image 80 passing over the scan line S into a selective state, and indicates the selective state by use of a selective frame 85. The thumbnail image 80 in the selective state is also referred to as a selective image.

Figure 15A:
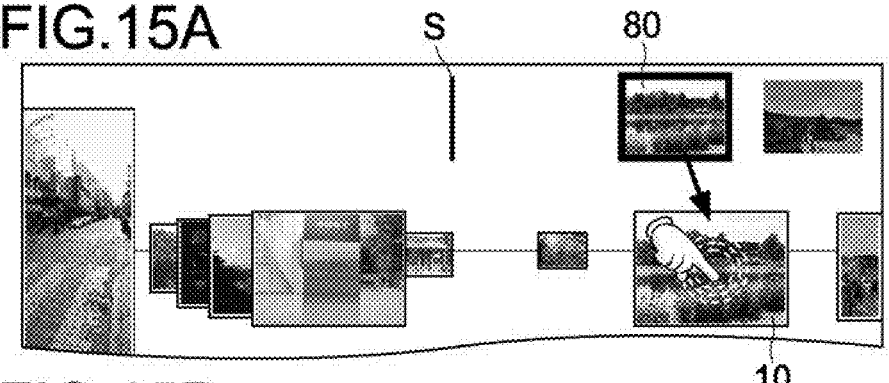
FIG. 15 are views showing transitions over time of the thumbnail images to be selected in the embodiment of the present invention.
Figure 15B:
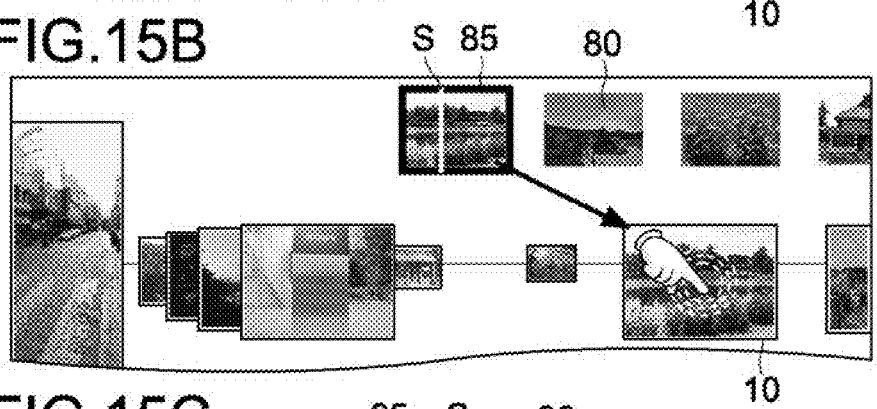

As described above, in this embodiment, the initial starting position for scrolling the thumbnail images 80 is set at the right edge of the thumbnail-displaying area. Thus, for a predetermined period from the start of the scroll, no thumbnail image 80 overlaps the scan line S existing in the center of the thumbnail-displaying area. In the above-mentioned case, as shown in FIG. 15A and FIG. 15B, the photograph-displaying application sets the lead thumbnail image 80 to be the selective image until the lead thumbnail image passes over the scan line S. Therefore, the photograph-displaying application displays the selective frame 85 surrounding the lead thumbnail image 80.

Figure 15C:
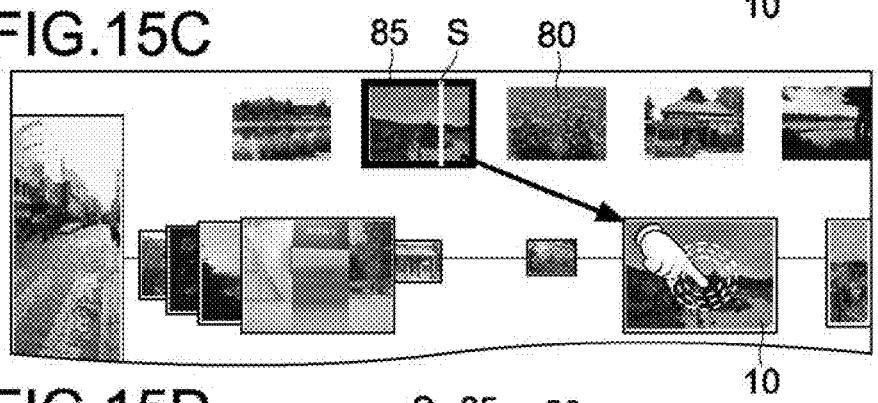
Figure 15D:
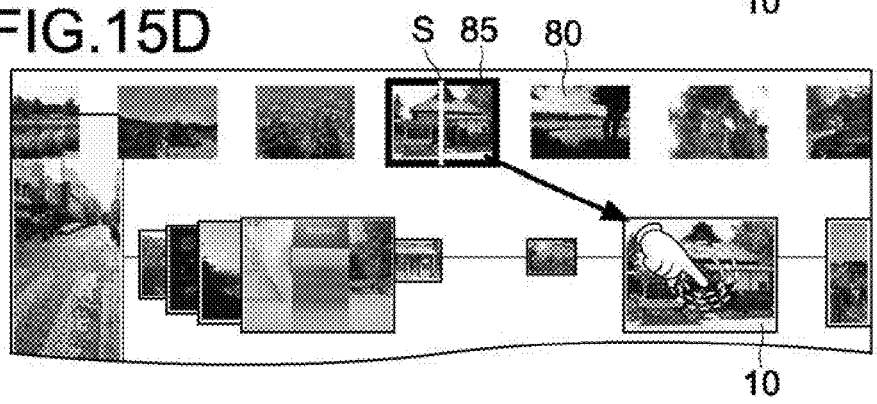

Then, as shown in FIG. 15C and FIG. 15D, when a part of a thumbnail image 80 right behind the thumbnail image 80 being in the selective state overlaps the scan line S due to the scroll, the photograph-displaying application sets the overlapping thumbnail image 80 as the selective image, and switches the selective frame 85 to be displayed from the lead thumbnail image 80 to the overlapping thumbnail image 80. During a time when a blank portion between the thumbnail images 80 is positioned on the scan line S, the photograph-displaying application keeps the last thumbnail image 80 (that is, on left side of scan line S) in the selective state.

In addition, the photograph-displaying application is capable of switching, during the scroll of the thumbnail images 80, the representative photograph 10 that the user is touching, in synchronization with the selective image one after another. That is, as shown in FIG. 15A to FIG. 15D, the photograph-displaying application continues displaying, during the time when the lead thumbnail image 80 is set as the selective state, the representative photograph 10 that the user touches first time. When the selective image is switched, the photograph-displaying application switches the representative photograph 10 in such a manner that the same image as the selective image (different in size reduction ratio) is sequentially displayed as the representative photograph 10. With this, the user can know which photograph 25 the user currently selects through viewing both of the thumbnail image 80 being as the selective image and the representative photograph 10.

(Display Processes when Touching)

In this embodiment, the photograph-displaying application is capable of performing different processes according to aspects of the touch operation by the user with respect to the representative photograph 10. FIG. 16 are views showing a transition of the display processes according to the touch operation with respect to the representative photograph 10.

Figure 16A:
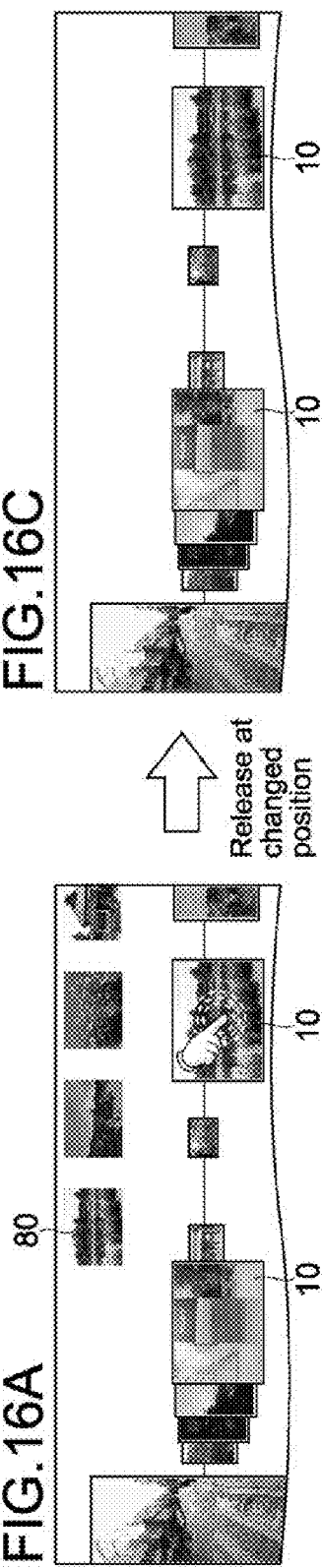
FIG. 16 are views showing transitions of the display processes according to a touch operation with respect to a representative photograph in the embodiment of the present invention.

As shown in FIG. 16A, during the time when the user is touching the representative photograph 10, the photograph-displaying application performs the above-mentioned scroll process.

Figure 16B:
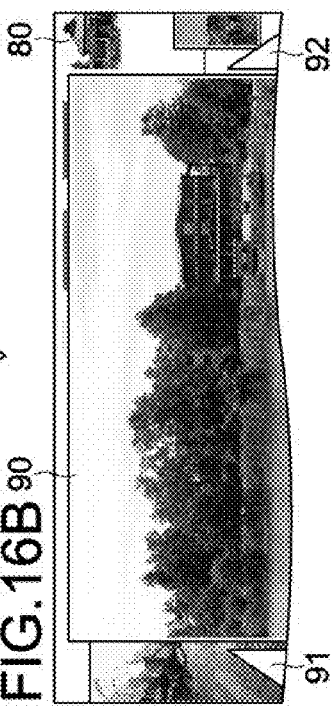

When the user releases the finger from the touch position without changing the touch position in FIG. 16A, the photograph-displaying application displays an original image 90 of the thumbnail image 80, which is selected at a release point in time, of the plurality of photographs belonging to the group represented by the representative photograph 10 touched by the user, the original image 90 being displayed with an original size thereof, as shown in FIG. 16B. The above-mentioned release operation is also referred to as a touch and release operation in the following.

As described above with reference to FIG. 15, when the thumbnail images 80 are being scrolled, the representative photograph 10 is also switched in synchronization with the selective image. Therefore, when the user releases the finger, the original image 90 of the representative photograph 10, which is displayed under the finger, is displayed. Thus, as seen from the user, due to the touch and release operation, the representative photograph 10 being touched is enlarged and displayed as it is.

Further, although will be described later, when the touch and release operation is input, a right button 92 and a left button 91 are also displayed on the right and left of the original image 90, respectively. When the user touches the right button 92 and the left button 91, it is possible to switch and display the original image 90 of each of other photographs 25 in the group represented by the representative photograph 10. An arranging order of the original images 90 to be displayed through the right button 92 and the left button 91 corresponds to an arranging order of the thumbnail images 80 described above.

Figure 16C:
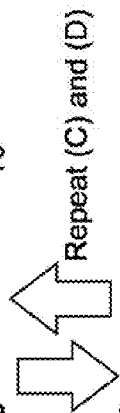

Meanwhile, when the user releases the finger from the touch state shown in FIG. 16A after moving the finger to an arbitrary direction while keeping the touch state, the photograph-displaying application removes all of the thumbnail images 80 in the thumbnail-displaying area as shown in FIG. 16C. In the following, the release operation is also referred to as a slide and release operation in order to discriminate it from the touch and release operation. Due to the slide and release operation, the user can perform a process of canceling the selection of the representative photograph 10 and the thumbnail image 80.

Figure 16D:
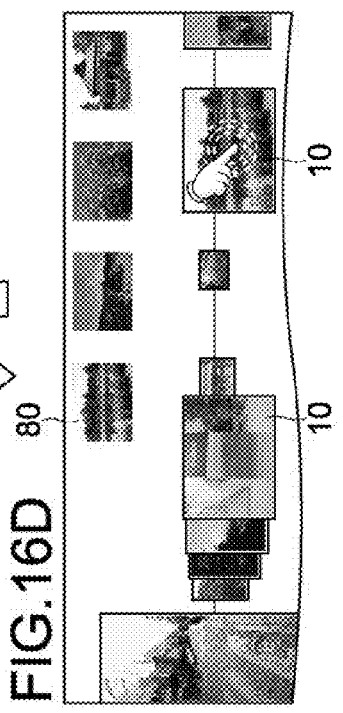

As shown in FIG. 16C, when the user touches again the same representative photograph 10 as that previously touched by the user after the state in which the thumbnail images 80 are removed is obtained, the photograph-displaying application restarts to scroll the thumbnail images 80 from the position displayed at a point in time when the touch is previously cancelled as shown in FIG. 16D. With this, even when the user touches the same representative photograph 10, it is possible for the user not to review the thumbnail images 80, which the user has been already viewed, in the group represented by the representative photograph previously touched by the user.

The photograph-displaying application repeats the display processes shown in FIG. 16C and FIG. 16D according to the repetition of the touch operation and the slide and release operation with respect to the same representative photograph 10.

(Details of Display Process for Thumbnail Images)

Next, the detailed description will be made of the display processes for the thumbnail images 80 by the photograph-displaying application. FIG. 17 is a flowchart of the display processes for the thumbnail images 80. Although the description of the flowchart will be made on the assumption that the CPU 11 of the portable terminal 100 is one that mainly performs the operation, the operation is actually performed in cooperation with the photograph-displaying application and other programs, which are executed under the control of the CPU.

As shown in FIG. 17, first, the CPU 11 reads the photographs 25 stored in the flash memory 13 one by one for each of the groups on the RAM 12 (Step 171), and generates a thumbnail image 80 of each of the photographs.

Subsequently, the CPU 11 displays, as a representative photograph 10, a thumbnail image 80 of a photograph 25 positioned at the head of the thumbnail images 80 as a sorting result according to the shooting date and time or the like in such a manner that the size of the thumbnail image 80 is adjusted for the virtual three-dimensional space as described above (Step 173).

Subsequently, the CPU 11 clears (initializes) the thumbnail-displaying area, and waits for a touch operation by the user (Step 174). In a case where it is detected that the user touches any one of the representative photographs 10 (Yes in Step 175), the CPU 11 reads N thumbnail images 80 in a group represented by that representative photograph 10 from the RAM 12, and stores data or a reference address thereof in a predetermined buffer (sequence THUMB[N]) having a size N. For example, the thumbnail image 80 being as the top image is saved in THUMB[0], and a second thumbnail image 80 is saved in THUMB[1].

Subsequently, the CPU 11 determines whether or not all of the thumbnail images 80 in the group can be accommodated in the thumbnail-displaying area, that is, whether or not the expression of (t_width+t_spacing)*N>s_width is established (Step 177).

In a case where it is determined that the expression of (t_width+t_spacing)*N>s_width is not established (No), the CPU 11 displays, as described above with reference to FIG. 10, all of the thumbnail images 80 in the thumbnail-displaying area at a time (Step 178).

In a case where it is determined that the expression of (t_width+t_spacing)*N>s_width is established (Yes), the CPU 11 determines whether or not the thumbnail images 80 are displayed first time regarding the above-mentioned group after the photograph-displaying application is actuated (Step 181).

In a case where it is determined that the thumbnail images 80 are displayed first time, the CPU 11 calculates an initial x-coordinate of each of the thumbnail images in the above-mentioned group (Step 182). Here, the x-coordinate is calculated by the expression of x=s_width+(n−1)*t_width+t_spacing when a left edge x-coordinate of an n-th thumbnail image 80 is set to "x," for example. The CPU 11 stores the calculated x-coordinate of each of the thumbnail images in a predetermined buffer (sequence POSX[N]) having a size N (Step 183). For example, the x-coordinate of the left edge of the lead thumbnail image 80 is stored in POSX[0], and a second thumbnail image 80 is stored in POSX[1].

Subsequently, the CPU 11 starts the scroll display process for the thumbnail images 80 in the thumbnail-displaying area based on the calculated x-coordinates, and, at the same time, displays the selective frame 85 (Step 187).

Subsequently, the CPU 11 adds the x-coordinates of the thumbnail images 80 (first thumbnail image 80 to n-th thumbnail image 80) with the loop variant being set to n. Provided that the x-coordinate of n-th thumbnail image 80 is indicated by POSX[n], the x-coordinate after the addition is calculated by the expression of POSX[n]=POSX[n]+t_speed*t_update. With this, each of the thumbnail images 80 is scroll-displayed to the left direction.

Subsequently, the CPU 11 determines whether or not the selective image is changed due to the scroll (Step 189). In a case where it is determined that the selective image is changed due to the scroll, the CPU 11 replace the above-mentioned representative photograph 10 by the same image as the selective image (Step 190).

During the scroll process for the thumbnail images 80, or after the process in Step 178, the CPU 11 determines whether or not the touch and release operation, which is described above with reference to FIG. 16, is detected (Step 179). That is, the CPU 11 determines whether or not the touch position is not changed and the touch is not detected any more. In a case where it is determined that the touch and release operation is detected (Yes), the CPU 11 displays the original image 90 of the selective image at this point in time (Step 191).

Further, the CPU 11 also determines whether or not the touch and slide operation is detected (Step 180). In a case where it is determined that the touch and slide operation is changed (Yes), the CPU 11 removes all of the thumbnail images 80 scroll-displayed (Step 192).

After that, the CPU 11 returns to Step 174 described above, and repeats the above-mentioned processes every time when the touch operation by the user is detected.

In a case where it is determined that the touch and release operation and the touch and slide operation are not detected (No in Step 180), the CPU 11 determines whether or not the right edge of the n-th thumbnail image 80 existing at the most left side run off the left edge of the thumbnail-displaying area, that is, whether or not the expression of POSX[n]+t_width<0 is established (Step 184). It is determined that the expression of POSX[n]+t_width<0 is established (Yes), the n-th thumbnail image is moved behind the end thumbnail image 80 (existing in invisible area) at this point in time (Step 185). An x-coordinate of the thumbnail image after moved becomes a position moved by a length obtained by multiplying a length with the number of thumbnail images 80, the later length being obtained by adding the width of each of the thumbnail images 80 with the width of the blank between the thumbnail images 80, with a thumbnail image 80, which is arranged on the right of the n-th thumbnail image 80 scrolled out of the visible area to the left side, being as a reference. That is, the x-coordinate after the movement is calculated by the expression of POSX[n]= POSX[n+1]+N*(t_width+t_spacing). After that, the CPU 11 repeats the processes after Step 187.

In Step 181 described above, in a case where it is determined that the display processes for the thumbnail images 80 are not performed regarding the above-mentioned group first time, the CPU 11 reads the x-coordinates of the thumbnail images 80 from the sequence POSX[N] (Step 186), and starts the scroll display process for the thumbnail images and the display processes for the selective frame 85 (Step 187). After that, the CPU 11 repeats the processes after Step 188.

Further, in Step 184 described above, in a case where it is determined that the expression of POSX[n]+t_width<0 is not established (No), that is, in a case where the right edge of the thumbnail image 80 arranged on the most left side does not yet arrives at the left edge of the thumbnail-displaying area, the CPU 11 reads the x-coordinates of the thumbnail images 80 from the sequence POSX[N] (Step 186), continues the scroll display process for the thumbnail images (Step 187), and repeats the processes after Step 189.

The CPU 11 repeats the above-mentioned processes every time when the touch operation by the user with respect to an arbitrary representative photograph 10 is detected.

FIG. 18 are views each showing a state in which the thumbnail images 80 are displayed according to the processes described above with reference to in FIG. 17 in the display example of the virtual three-dimensional space shown in FIG. 6. As shown in FIG. 18A, the thumbnail images 80 are displayed in such a state that the thumbnail images 80 overlap the overhead-view navigation image 30 and the number line image 41, for example.

As shown in FIG. 18B, in a case where the touch and release operation is detected, the original image 90 is displayed to the full screen size. The original image 90 is switched through the right button 92 and the left button 91 one after another.

The touch and release operation corresponds to an operation of deploying a group (opening folder) represented by a representative photograph 10 to be touched and opening photographs in the folder in the related art. However, in this embodiment, the user can perform the viewing process for the original image 90 through only one touch and release operation.

Further, as shown in FIG. 18C, in a case where the touch and slide operation (release operation after slide to the arrow direction of FIG. 18, for example) is detected, the thumbnail images 80 are removed.

CONCLUSION

As described above, according to this embodiment, the portable terminal 100 is capable of scroll-displaying each of the thumbnail images 80 of the plurality of the photographs 25 belonging to each of the groups in the thumbnail-displaying area during the time when the touch operation with respect to the representative photograph 10 is detected. Thus, the user is allowed to see a preview of the contents of all of the photographs 25 in the group through only one touch operation, to thereby easily search for a desired photograph 25 without the operation of opening folders as performed in the past. That is, the user can reduce stress caused due to the screen transitions involved with opening folder from a folder list, searching for a desired photograph in that folder, and returning to the folder list again, which has been performed in the past.

Further, the portable terminal 100 puts the thumbnail image 80 passing over the scan line S during the scroll into the selective state, and hence it is possible to display the original image 90 of the above-mentioned thumbnail image 80 according to the subsequent touch and release operation by the user. That is, the user can easily and intuitively view a desired photograph 25 through a very simple operation of the touch and release operation associated with the touch operation.

Modifications

Embodiments according to the present invention are not limited to the above-mentioned embodiment, and can be variously modified without departing from the gist of the present invention.

Although in the above-mentioned embodiment, the thumbnail-displaying area is provided in the upper portion of the display area of the display 14, the thumbnail-displaying area is not limited to thereto. For example, the thumbnail-displaying area may be provided in a lower position of the display area of the display 14. Further, although in the above-mentioned embodiment, the scroll direction of the thumbnail images 80 is set to be performed from the right to the left, the scroll direction is not also limited to thereto. For example, in the thumbnail-displaying area in the above-mentioned embodiment, the portable terminal 100 may scroll the thumbnail images 80 from the left to the right. Further, in the portable terminal 100, the thumbnail-displaying area may be provided at the left edge or the right edge of the display 14, for example, and the thumbnail images 80 may be scrolled in an upper and lower direction. In addition, for example, the portable terminal 100 may scroll the thumbnail images 80 on a diagonal line from any corner of the display area of the display 14, or may scroll the thumbnail images 80 as if the thumbnail images 80 draw a helical track from the center of the display area of the display 14.

Figure 19:
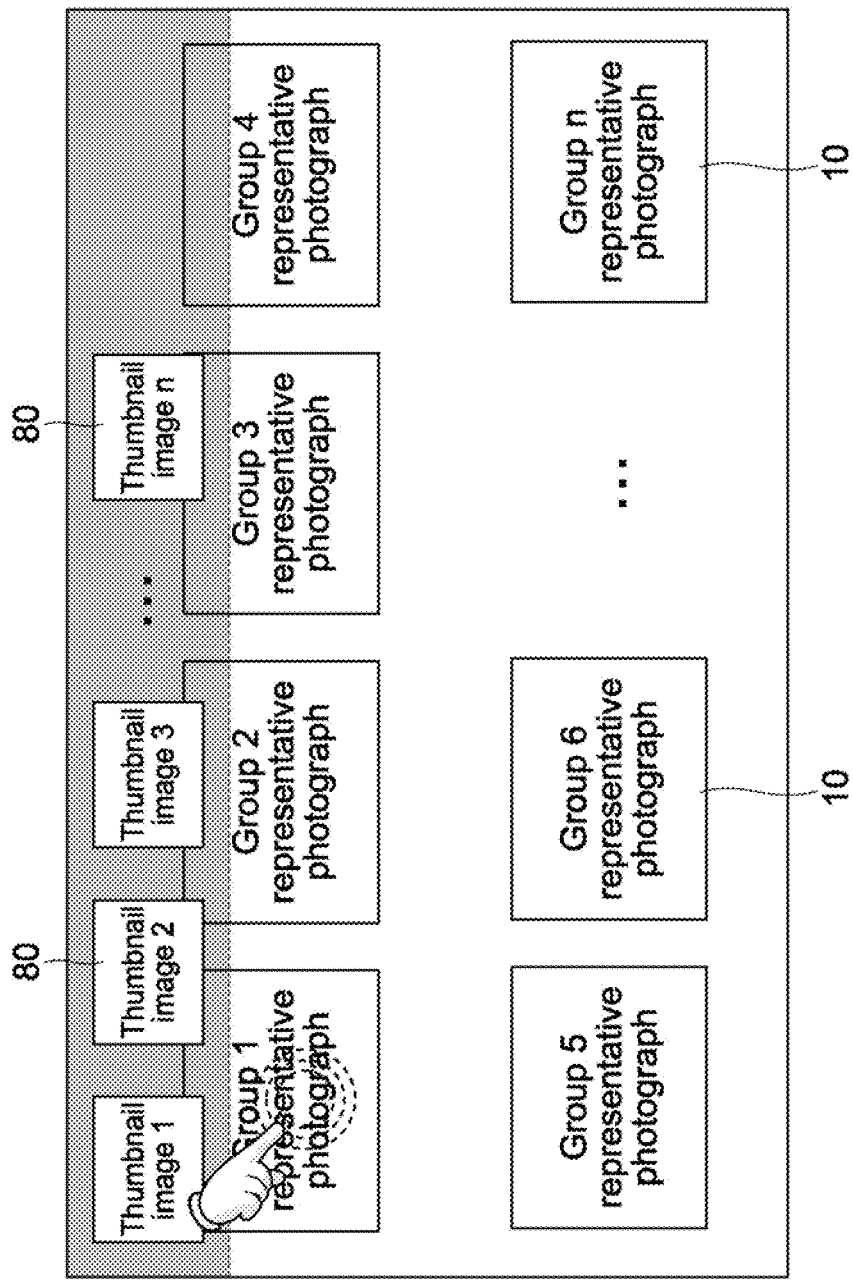
FIG. 19 is a view showing a display conception for the thumbnail images in another embodiment of the present invention.

In the above-mentioned embodiment, the scroll display process for the thumbnail images 80 is performed through touching one of the representative photographs 10 displayed to have a perspective by using the virtual three-dimensional space. However, the scroll display process is not limited to that in the virtual three-dimensional space. For example, as shown in FIG. 19, the portable terminal 100 may arrange the representative photographs 10 in a matrix form to have the same size in a plane, for example, and may perform scroll display process for the thumbnail images 80 as described above when any one of the representative photographs 10 is touched.

Although in the above-mentioned embodiment, the portable terminal 100 performs the scroll display process for the thumbnail images 80 during the time when the touch operation is detected, an operation of triggering the scroll display process is not limited to thereto. For example, the portable terminal 100 may start the scroll display process for the thumbnail images 80 when the representative photograph 10 is touched and released similarly to a one-click operation of a computer mouse, and the portable terminal 100 may remove the thumbnail images 80 when the representative photograph 10 is again touched and released. Further, the portable terminal 100 may display the original image 90 when the representative photograph 10 to be operated is double-touched and released similarly to a double-click operation of the computer mouse when the thumbnail images 80 are being scrolled.

Although in the above embodiment, the case where the user touches the representative photograph 10 with the finger is described, it is needless to say that the same processes may be performed even in a case where the representative photograph 10 is touched with an accessory such as a stylus other than the finger.

Although in the above embodiment, the example in which the present invention is applied to the portable terminal has been described, the present invention is applicable also to other electronic apparatuses including, for example, a notebook PC, a desk top PC, a server apparatus, a recording/reproducing apparatus, a digital still camera, a digital video camera, a television apparatus, a car navigation apparatus. In this case, if the representative images 10 and the thumbnail images 80 can be output to the outside display, the display not have to be provided in those apparatuses. Further, each of those apparatuses may not include the touch panel. For example, operations corresponding to the touch operation, the touch and release operation, and the touch and slide operation, which are described above may be input through input apparatuses such as the computer mouse, a keyboard, and specific buttons. In this manner, the scroll display process and the remove process for the thumbnail images 80, the display process for the original image 90, and the like may be performed according to each of those operations.

Although in the above-mentioned embodiment, the digital photograph images are objects to be displayed, any images other than the photographs may be objects to be displayed.

The present application contains subject matter related to that disclosed in Japanese Priority Patent Application JP 2010-079167 filed in the Japan Patent Office on Mar. 30, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic apparatus, comprising:
    a memory configured to classify a plurality of images into each of a plurality of groups that includes a first group, and to store the classified images;
    a display configured to:
    output a first image, wherein the first image is a first thumbnail image of a representative image of the first group, at a first position in a virtual three-dimensional space,
    wherein the first position is determined based on time, altitude information associated with the representative image, and location metadata of the representative image,
    wherein the first position is further determined based on a horizontal axis, a vertical axis, and a depth axis of the virtual three-dimensional space, and
    wherein the horizontal axis corresponds to an azimuth direction determined based on the location metadata of the representative image, the position along the depth axis is determined based on time metadata of the representative image, and the vertical axis corresponds to the altitude information associated with the representative image;
    a touch panel configured to detect a touch operation by a user on the first image; and
    one or more processors configured to control, based on detection of the touch operation, the display:
    to output, in addition to the first image, a plurality of second images arranged in a first direction, wherein each of the plurality of second images is a thumbnail image of a corresponding image in the first group, and
    to scroll the plurality of second images in the first direction.

2. The electronic apparatus according to claim 1, wherein the touch panel is integrated with the display, and
    the one or more processors are further configured to, based on absence of the touch operation, designate an image of the first group as the representative image, and control the display to output the first image that corresponds to the designated representative image and the plurality of second images.

3. The electronic apparatus according to claim 2,
    wherein the touch panel is configured to detect a slide operation to move a touch position with the touch operation being continued, and
    wherein the one or more processors are further configured to control, based on the absence of the touch operation after the detection of the slide operation, the display to stop a scroll of the plurality of second images and to remove the plurality of second images.

4. The electronic apparatus according to claim 3,
    wherein the one or more processors are further configured to control, based on a subsequent detection of the touch operation after the absence of the touch operation, the display to restart the scroll of the plurality of second images from a third position in which the scroll is stopped.

5. The electronic apparatus according to claim 2, wherein the one or more processors are further configured to control the display to:
    put, based on at least one of the scrolled plurality of second images exists at a third position on the touch panel, the at least one of the scrolled plurality of second images on the third position into a selective state;
    remove the at least one of the scrolled plurality of second images in the selective state; and
    output an original image that corresponds to the at least one of the scrolled plurality of second images that is in the selective state based on the absence of the touch operation in the selective state.

6. The electronic apparatus according to claim 5,
wherein the one or more processors are further configured to control the display to switch the representative image in synchronization with the original image that corresponds to the at least one of the scrolled plurality of second images in the selective state in the duration of the scroll.

7. An image output method, comprising:
classifying a plurality of images into each of a plurality of groups including a first group, and storing the classified images;
outputting a first image, wherein the first image is a first thumbnail image of a representative image of the first group, at a position in a virtual three-dimensional space,
wherein the position is determined based on time, altitude information associated with the representative image, and location metadata of the representative image,
wherein the position is further determined based on a horizontal axis, a vertical axis, and a depth axis of the virtual three-dimensional space, and
wherein the horizontal axis corresponds to an azimuth direction determined based on the location metadata of the representative image, the position along the depth axis is determined based on time metadata of the representative image, and the vertical axis corresponds to the altitude information associated with the representative image;
detecting a touch operation by a user on the first image;
outputting, based on detection of the touch operation, in addition to the first image, a plurality of second images arranged in a first direction, wherein each of the plurality of second images is a thumbnail image of a corresponding image in the first group; and
scrolling the plurality of second images in the first direction.

8. A non-transitory computer-readable medium having stored thereon, computer-executable instructions for causing an electronic apparatus to execute operations, the operations comprising:
classifying a plurality of images into each of a plurality of groups including a first group, and storing the classified images;
outputting a first image, wherein the first image is a first thumbnail image of a representative image of the first group, at a position in a virtual three-dimensional space,
wherein the position is determined based on time, altitude information associated with the representative image, and location metadata of the representative image,
wherein the position is further determined based on a horizontal axis, a vertical axis, and a depth axis of the virtual three-dimensional space, and
wherein the horizontal axis corresponds to an azimuth direction determined based on the location metadata of the representative image, the position along the depth axis of the virtual three-dimensional space is determined based on time metadata of the representative image, and the vertical axis corresponds to the altitude information associated with the representative image;
detecting a touch operation by a user on the first image;
outputting, based on detection of the touch operation, in addition to the first image, a plurality of second images arranged in a first direction, wherein each of the plurality of second images is a thumbnail image of a corresponding image in the first group; and
scrolling the plurality of second images in the first direction.

* * * * *